(12) United States Patent
Kumar et al.

(10) Patent No.: US 11,301,984 B1
(45) Date of Patent: Apr. 12, 2022

(54) SYSTEM TO DETERMINE USER INTERACTION WITH FIXTURE

(71) Applicant: AMAZON TECHNOLOGIES, INC., Seattle, WA (US)

(72) Inventors: Dilip Kumar, Seattle, WA (US); Nikhil Chacko, Seattle, WA (US); Nishitkumar Ashokkumar Desai, Redmond, WA (US); Jayakrishnan Kumar Eledath, Kenmore, WA (US); Gopi Prashanth Gopal, Redmond, WA (US); Gerard Guy Medioni, Seattle, WA (US); Kushagra Srivastava, Issaquah, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/022,439

(22) Filed: Jun. 28, 2018

(51) Int. Cl.
*G06K 9/00* (2006.01)
*G06T 7/00* (2017.01)
(Continued)

(52) U.S. Cl.
CPC .......... *G06T 7/0008* (2013.01); *G01G 19/52* (2013.01); *G06N 5/041* (2013.01); *G06Q 20/40* (2013.01);
(Continued)

(58) Field of Classification Search
CPC ......... G06T 5/005; G06T 5/006; G06T 5/007; G06T 5/008; G06T 5/009; G06T 7/0008; G06T 7/70; G06T 7/20; G06T 2207/30196; G01G 19/52; G01G 19/024; G01G 19/027; G01G 19/035; G01G 19/047; G06N 5/041; G06Q 20/40; G06Q 20/203; G06Q 20/0223; G06Q 10/087; G01J 3/0248; G01J 5/0859; G01M 11/064; G05D 1/0426;
(Continued)

(56) References Cited

U.S. PATENT DOCUMENTS 5,561,274 A 10/1996 Brandorff
7,225,980 B2 6/2007 Ku et al.
(Continued)

OTHER PUBLICATIONS

Dimech, Andrew, "Weight Sensing Shelves", Video from YouTube, 3:20 duration, uploaded on Sep. 24, 2015. Retrieved from Internet: https://www.youtube.com/watch?v=71GboW_pWWc.
(Continued)

*Primary Examiner* — Huy C Ho
(74) *Attorney, Agent, or Firm* — Lindauer Law, PLLC

(57) ABSTRACT

Sensors in a facility obtain sensor data about a user's interaction with a fixture, such as a shelf. The sensor data may include images such as obtained from overhead cameras, weight changes from weight sensors at the shelf, and so forth. Based on the sensor data, one or more hypotheses that indicate the items and quantity may be determined and assessed. The hypotheses may be based on information such as the location of a user and where their hands are, weight changes, physical layout data indicative of where items are stowed, cart data indicative of what items are in the possession of the user, and so forth. A hypothesis having a greatest confidence value may be deemed to be representative of the user's interaction, and interaction data indicative of the item and quantity may be stored.

20 Claims, 12 Drawing Sheets

(51) Int. Cl.
  *G06N 5/04* (2006.01)
  *G06T 7/70* (2017.01)
  *G01G 19/52* (2006.01)
  *G06Q 20/40* (2012.01)
  *G06T 7/20* (2017.01)

(52) U.S. Cl.
  CPC .................. *G06T 7/20* (2013.01); *G06T 7/70* (2017.01); *G06T 2207/30196* (2013.01)

(58) Field of Classification Search
  CPC ............ G06F 16/786; G10H 2220/455; G05B 2219/31319
  USPC .......................................................... 382/103
  See application file for complete search history.

(56) References Cited

U.S. PATENT DOCUMENTS

| | | | |
|---|---|---|---|
| 7,949,568 B2 | 5/2011 | Fano et al. | |
| 8,009,864 B2 | 8/2011 | Linaker et al. | |
| 8,189,855 B2 | 5/2012 | Opalach et al. | |
| 8,630,924 B2 | 1/2014 | Groenevelt et al. | |
| 9,235,928 B2 | 1/2016 | Medioni et al. | |
| 9,473,747 B2 | 10/2016 | Kobres et al. | |
| 10,148,918 B1 | 12/2018 | Seiger et al. | |
| 10,157,452 B1 | 12/2018 | Tighe et al. | |
| 10,244,363 B1 | 3/2019 | Niranjayan et al. | |
| 10,311,760 B1 | 6/2019 | McMahon et al. | |
| 10,438,164 B1 | 10/2019 | Xiong et al. | |
| 10,459,103 B1 | 10/2019 | Shi et al. | |
| 10,521,646 B2 | 12/2019 | Adato et al. | |
| 10,685,237 B1 | 6/2020 | Mirza et al. | |
| 2007/0050271 A1 | 3/2007 | Ufford et al. | |
| 2007/0142732 A1 | 6/2007 | Brockway et al. | |
| 2011/0011936 A1 | 1/2011 | Morandi et al. | |
| 2012/0080517 A1 | 4/2012 | Braunstein | |
| 2012/0284132 A1 | 11/2012 | Kim et al. | |
| 2013/0284806 A1* | 10/2013 | Margalit | G06Q 30/06 235/382 |
| 2014/0201041 A1 | 7/2014 | Meyer | |
| 2014/0201042 A1* | 7/2014 | Meyer | G06Q 10/087 705/28 |
| 2014/0297487 A1* | 10/2014 | Bashkin | G06Q 10/087 705/28 |
| 2015/0012396 A1 | 1/2015 | Puerini et al. | |
| 2015/0075879 A1 | 3/2015 | Sakai et al. | |
| 2015/0086107 A1 | 3/2015 | Dedeoglu et al. | |
| 2015/0254603 A1 | 9/2015 | Bashkin | |
| 2017/0228686 A1 | 8/2017 | Rodriguez et al. | |
| 2018/0197139 A1 | 7/2018 | Hill | |
| 2019/0000382 A1 | 1/2019 | Fitzpatrick | |
| 2019/0152634 A1 | 5/2019 | Almogy et al. | |
| 2019/0333039 A1 | 10/2019 | Glaser et al. | |
| 2020/0005319 A1 | 1/2020 | Scarborough et al. | |

OTHER PUBLICATIONS

Mutschler, Joseph M., "Non-final Office Action dated Dec. 10, 2018", U.S. Appl. No. 151/95,964, The United States Patent and Trademark Office, filed Dec. 10, 2018.

Flintec, "Type PB Load Cell", www.flintec.com, Retrieved from the Internet: <URL: https://www.flintec.com/wp-content/uploads/2016/09/pb-planar-datasheet-en.pdf>.

Asthana, et al., "An Indoor Wireless System for Personalized Shopping Assistance", CiteSeerX, In Proceedings of IEEE Workshop on Mobile Computing Systems and Applications, 1994. Retrieved from the Internet: <URL:http://citeseerx.ist.psu.edu/viewdoc/summary?doi=10.1.1.127.3033>.

Barbee, Manuel L., "Final Office Action dated Dec. 29, 2017", U.S. Appl. No. 14/576,263, The United States Patent and Trademark Office, filed Dec. 29, 2017.

Barbee, Manuel L., "Non-Final Office Action dated Jun. 30, 2017", U.S. Appl. No. 14/576,263, The United States Patent and Trademark Office, filed Jun. 30, 2017.

Crandall, et al., "Signal Processing Techniques", U.S. Appl. No. 15/199,030, The United States Patent and Trademark Office, filed Jun. 30, 2016.

Kalnikaite, et al., "How to Nudge In Situ: Designing Lambent Devices to Deliver Information Salience in Supermarkets", ACM, In proceeding of: UbiComp 2011:Ubiquitous Computing, l3th International Conference, UbiComp 2011, Beijing,China, Sep. 17-21, 2011.Retrieved from the Internet: <URL:http://www.researchgate.net/publication/221568350_How_to_nudge_in_Situ_designing_lambent_devices_to_deliver_salient_information_in_supermarkets>.

Pop, Cristian, "Introduction to the BodyCom Technology", AN1391, DS01391A, Microchip Technology, Inc., May 2, 2011.

Vu, et al., "Distinguishing Users with Capacitive Touch Communication", WINLAB, Rutgers University, In proceedings of: The 18th Annual International Conference on Mobile Computing and Networking ("MobiCom'12"), Aug. 22-26, 2012, Istanbul, Turkey.

Iwarere, Oluseye, "Non-final Office Action dated Jun. 23, 2020", U.S. Appl. No. 15/939,063, The United States Patent and Trademark Office, Jun. 23, 2020.

Iwarere, Oluseye, "Notice of Allowance dated Oct. 1, 2020", U.S. Appl. No. 15/939,063, The United States Patent and Trademark Office, Oct. 1, 2020.

Iwarere, Oluseye, "Non-final Office Action dated Aug. 26, 2021", U.S. Appl. No. 15/939,063, The United States Patent and Trademark Office, Aug. 26, 2021.

* cited by examiner

SYSTEM TO DETERMINE USER INTERACTION WITH FIXTURE

INCORPORATED BY REFERENCE

U.S. patent application Ser. No. 14/576,263 titled "Sensor Data Processing System" filed Dec. 19, 2014 is hereby incorporated by reference for all that it contains.

U.S. patent application Ser. No. 15/195,964 titled "System to Determine User Interaction with Fixture" filed Jun. 28, 2016 is hereby incorporated by reference for all that it contains.

U.S. patent application Ser. No. 15/199,030 titled "Signal Processing Techniques" filed Jun. 30, 2016 is hereby incorporated by reference for all that it contains.

U.S. patent application Ser. No. 15/634,695 titled "Multi-Load Cell Weighing Shelf" filed Jun. 27, 2017 is hereby incorporated by reference for all that it contains.

U.S. patent application Ser. No. 15/939,063 titled "Interaction Determination Using Data from Weight Sensors" filed Mar. 28, 2018 is hereby incorporated by reference for all that it contains.

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas, such as in a shopping area, and customers can pick items from inventory and take them to a cashier for purchase, rental, and so forth.

Many physical stores also maintain inventory in a storage area, fulfillment center, or other facility that can be used to replenish inventory located in the shopping areas or to satisfy orders for items that are placed through other channels (e.g., e-commerce). Other examples of facilities holding inventory include libraries, museums, rental centers, and so forth. In each instance, for an item to be moved from one location to another, it is picked from its current location and transitioned to a new location. It is often desirable to monitor the movement of inventory within the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
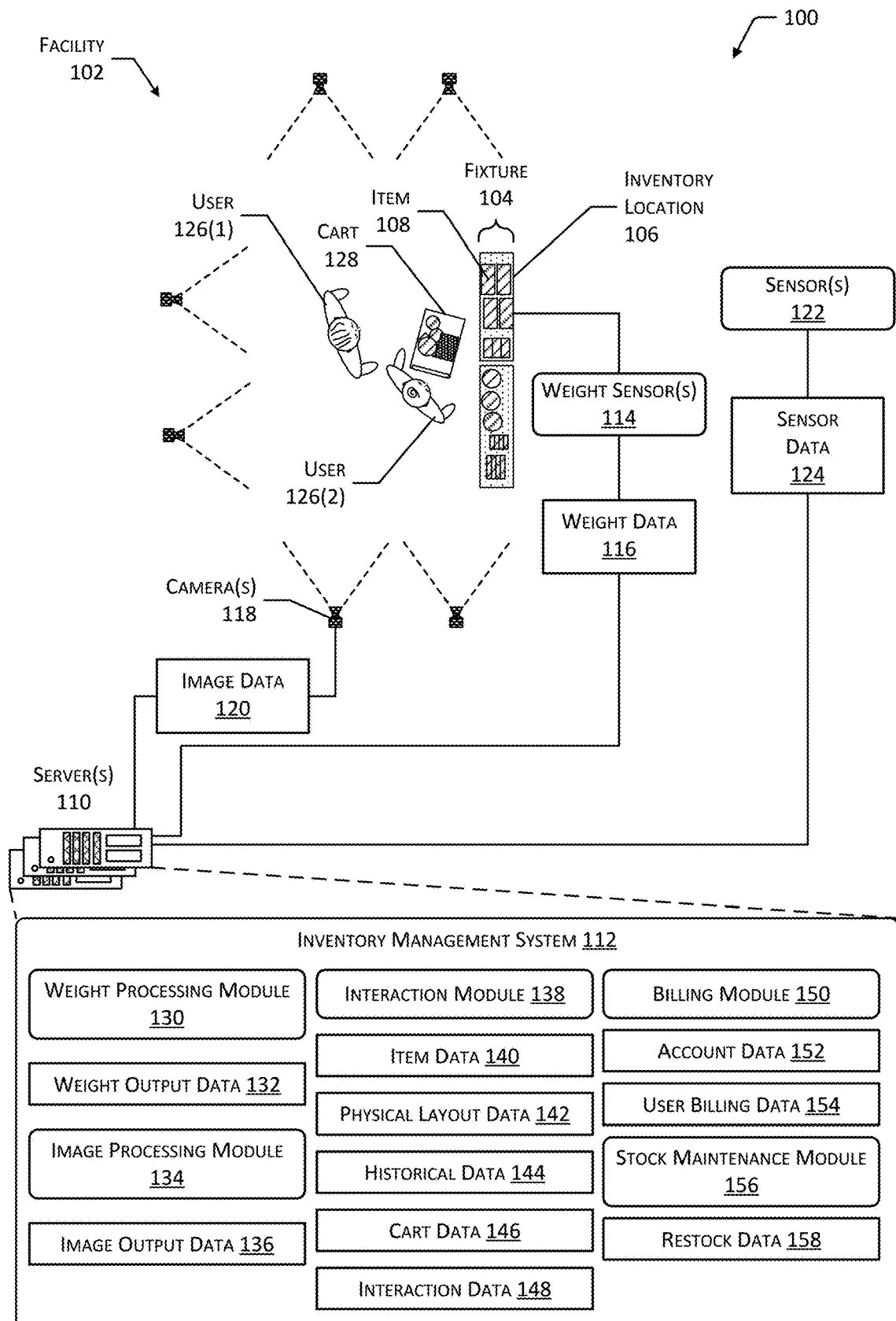
FIG. 1 illustrates a system that determines interaction data by a user with an inventory location, such as a lane on a shelf, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

A materials handling facility (facility) or other setting may utilize fixtures that provide inventory locations used to stow or otherwise hold items. For example, the fixture may comprise a shelf with inventory locations comprising different areas, such as lanes, within which are stowed different types of items. The fixtures or the environment around the fixtures may include one or more sensors that generate sensor data. These sensors may include weight sensors, cameras, radio receivers, and so forth. Different type of sensors produce different kinds of sensor data. For example, each shelf may have weight sensors and associated electronics that generate weight data, the cameras may generate image data, the radio receivers may provide received data, and so forth.

A user may perform an interaction that includes one or more events. For example, the interaction may be picking up an item to look at it, and then returning it to the inventory location. Each interaction may include one or more events. Continuing the example, the first event may be the pick of the item while the second event is the return of the item.

The sensor data may be processed by an inventory management system to determine interaction data such as whether an item has been placed at the inventory location or picked from the inventory location. For example, the inventory management system may process the weight data to determine weight output data, such as a time that an event may have happened, whether the event involved a weight decrease (such as due to a pick) or increase (such as due to a place), a location of the event with respect to the inventory of a weight change, and so forth.

The inventory management system may process the image data to determine image output data. For example, the image output data may be indicative of a location of the user in the facility, where a hand of the user is with respect to the inventory location, whether a visible change in an area of the inventory location has occurred, a trajectory of movement of the hand, whether the hand is holding an item, identification of the item in the hand, and so forth.

The inventory management system may then use one or more of the weight output data or the image output data to generate interaction data. The interaction data may include one or more of a type of item, a quantity of the type of item, and a type of interaction comprising one or more of removal of the type of item from the fixture, placement of the type of item to the fixture, or rummaging involving the type of item at the fixture. In some implementations the interaction data may include information about the user who is associated with the interaction. For example, the interaction data may include a user identifier, an account identifier, and so forth.

The system generates hypotheses based on inputs from sensor data, such as the weight output data, image output data, as well as previously stored data such as physical layout data, historical data, cart data, and so forth. For example, the weight output data may indicate that there is a weight change event on shelf A394 of −353 grams that took place between a first time and a second time. The image output data may include location data. For example, the location data may indicate that there was a first user 0.71 meters from shelf A394 and a second user 0.54 meters from shelf A394 during that time. The image output data may include touchpoint data that indicates if an object has passed a threshold or boundary associated with respect to an inventory location. The image output data may include area status data that indicates that there was a visible event of a change in the appearance at area 3 on shelf A394 between the first time and the second time. The image output data may also indicate other data, such as described below, such as trajectory data, segmentation data, item in-hand data, and so forth. The physical layout data indicates that shelf A394 area 3 is assigned to stow item type B3949130. Weight data is retrieved that indicates that the weight of a single item of item type B3949130 is 350 grams.

The system may generate hypotheses based on this data, such as a first hypothesis that a quantity of 1 of item type B3949130 was picked by the first user, a second hypothesis that the pick was by the second user, and so forth. The hypotheses may contain various permutations of possible types of items and quantities that are consistent with the situation.

The image output data may be used to determine the hypotheses, or to further evaluate the hypotheses. For example, the image output data may include trajectory data for the hands of the first user and the second user between the first time and the second time. If the trajectory data indicates that the hands of the first user entered shelf A394 between the first time and the second time while the hands of the second user did not enter shelf A394, the hypotheses involving the second user may be removed from consideration or exhibit a low confidence value. In some implementations, each hypothesis in the set of hypotheses may include a confidence value that is indicative of a likelihood that the hypothesis is correct. A selected hypothesis may be determined from the set of hypotheses based on the confidence value. For example, a hypothesis in the set that has a greatest confidence value that also exceeds a threshold value may be designated as the selected hypothesis. The selected hypothesis may then be used to generate the interaction data.

The interaction data may be used to operate the facility. Continuing the example above, the interaction data may indicate that the first user picked a quantity of 1 of item B3949130. Based on this information, if the first user leaves the facility without returning the item, a payment account associated with the first user will be billed for the cost of that item. In another example, the interaction data may be used to maintain stock levels of the items, such as generating restocking orders when quantity on hand of items at an inventory location is below a threshold value.

When the best hypotheses produced by the inventory management system for an interaction have confidence values that are too low, a human operator or other system may be used to determine the interaction data. By using the techniques described in this disclosure, operation of the facility is improved because the confidence values of hypotheses in various circumstances are improved, resulting in generation of accurate interaction data without recourse to a human operator or other system. This reduces the latency of operation of the inventory management system, reduces operational costs associated with human intervention, and so forth. As a result, the inventory management system is able to operate more quickly and efficiently.

Illustrative System

FIG. 1 illustrates a system 100 to determine interaction data that is indicative of an interaction of a user with an inventory location, such as a lane on a shelf, according to some implementations. A facility 102 may include one or more fixtures 104 that provide one or more inventory locations 106. For example, the fixtures 104 may comprise racks with shelving, bins, and so forth, and the inventory location 106 may include individual shelves, bins, and so forth. The inventory location 106 may be divided into areas designated for stowage of particular types of items 108. For example, a shelf may be divided into lanes, with particular types of items 108 designated as being stowed within particular lanes. In some implementations different types of items may be stowed in different lanes, while in other implementations the same type of item may be stowed in the different lanes.

The facility 102 may be connected to one or more networks, which in turn connect to one or more servers 110. An inventory management system 112 may be executed on the processors of the servers 110. The inventory management system 112 may receive data from various sensors associated with the facility 102.

The fixtures 104 may include weight sensors 114 that produce weight data 116. The weight data 116 may be indicative of a force measured by a weight sensor 114, such as produced by a weight of an item 108. For example, each shelf may be supported by a plurality of weight sensors 114 proximate to the corners of the shelf's platform that provide weight data 116 to the servers 110. The weight data 116 may comprise data indicative of a particular weight sensor 114 or data indicative of a location of the particular weight sensor 114 with respect to the fixture 104, and a time series of force measurements acquired by that particular weight sensor 114.

As items 108 or other objects are placed on or removed from the shelf, the weight measured by the weight sensors 114 changes. In another example, at least a portion of the floor may include weight sensors 114 that generate weight data 116 as items 108 are moved onto or removed from that portion of the floor. The weight sensors 114 may comprise load cells, strain gauges, pressure sensors, and so forth. In some implementations the weight data 116 may comprise serialized data indicative of a signal produced by one or more weight sensors 114.

The facility 102 may include one or more cameras 118 that generate image data 120 that is provided to the one or more servers 110. The cameras 118 or other imaging sensors are configured to acquire images of a scene. The cameras 118 are configured to detect light in one or more wavelengths including, but not limited to, terahertz, infrared, visible, ultraviolet, and so forth. The cameras 118 may comprise charge coupled devices (CCD), complementary metal oxide semiconductor (CMOS) devices, microbolometers, and so forth. In some implementations the cameras 118 may provide depth or distance information as well. For example, the cameras 118 may use structured light, stereo vision, time of flight, or other techniques and devices to determine a distance between the camera 118 and an object in the scene.

The cameras 118 may be positioned with their fields of view (FOV) including inventory locations 106, portions of the facility 102 such as entries, aisles, exits, and so forth. For example, the cameras 118 may be mounted overhead looking down, on the fixture 104, and so forth. In some implementations, a camera 118 may have a FOV that includes a particular area at the inventory location 106, such as a lane. The image data 120 may comprise one or more of still images, video, preprocessed data, and so forth. For example, the camera 118 may include a processor that uses raw image data to generate preprocessed data comprising tag data that identifies an object in an image as being a user, head of a user, hand of a user, cart, cropped images of the tagged objects, and so forth. In another example, the camera 118 may determine change data indicative of a change between two or more images, report location data of an object such as a user 126 or cart 128, and so forth.

The facility 102 may include other sensors 122 that produce other sensor data 124. For example, the other sensors 122 may include proximity sensors, instrumented auto facing units, a smart floor, and so forth.

One or more users 126 may move about the facility 102. The user 126 may utilize a cart 128 or other device such as a bag, basket, and so forth to facilitate the movement of items 108. For example, the user 126 may pick an item 108 from the inventory location 106 and place it into the cart 128. The user 126 may be associated with a particular account. For example, the user 126 may be associated with a payment account. After leaving the facility 102, the payment account of the user 126 may be billed for the cost of the items 108 that were removed.

A user may perform an interaction that includes one or more events. Interactions may include the user picking an item from an inventory location, placing an item at the inventory location, touching an item at the inventory location, rummaging through items at the inventory location, and so forth. Each interaction may include one or more events that are indicative of a particular action. For example, an interaction may include a first event where the user picks a first item, a second event where the user returns the first item, and a third event where the user picks a second item.

The inventory management system 112 may include a weight processing module 130. The weight processing module 130 may accept the weight data 116 as input and produce weight output data 132. For example, the weight processing module 130 may use a signal conditioning module to produce denoised data. The denoised data may then be processed by an event detection module to determine event data indicative of a weight change event. The weight output data 132 may be indicative of one or more of occurrence and start/stop times of a weight change event, determine an estimated location of the weight change event due to a change in the center of gravity, determine a net weight change associated with the weight change event, and so forth. The weight processing module 130 may implement one or more of the techniques or systems described in U.S. patent application Ser. No. 15/939,063 titled "Interaction Determination Using Data from Weight Sensors" filed Mar. 28, 2018.

In some implementations, weight changes associated with a particular event may be processed using an item weight model that determines a probability that an observed weight change involves a particular type of item. The weight output data 132 may include information indicative of the types of items and the probability that the weight change is representative of a particular type of item.

The inventory management system 112 may include an image processing module 134. The image processing module 134 may accept the image data 120 as input and produce image output data 136. For example, the image output data 136 may include location data that indicates where the user 126 is with respect to the inventory location 106, touchpoints where at least a portion of the user 126 has crossed a threshold with respect to the inventory location 106, area status data that indicates a visible change at an area of the inventory location 106, trajectory data that describes the motion of the user 126 or portion thereof, data of a type of item 108 being held by the user 126, and so forth. The image processing module 134 is discussed in more detail with regard to FIG. 2.

During operation, an interaction module 138 of the inventory management system 112 may use one or more of the weight output data 132 or the image output data 136 as well as one or more of item data 140, physical layout data 142, historical data 144, or cart data 146 to determine interaction data 148.

The item data 140 comprises information about a particular type of item 108. The item data 140 may include information indicative of a weight of a single item 108, or a package, kit, or other grouping considered to be a single item 108. The item data 140 may include other characteristics of that type of item 108 such as: physical dimensions, feature vectors representative of appearance of the item 108, and so forth. The item data 140 may indicate the types and quantities of items 108 that are expected to be stored at a particular inventory location 106. The item data 140 may include other data. For example, the other data may comprise weight distribution of the item 108, data indicative of value of an associated barcode or other machine-readable mark that is on the item 108, value of a radio frequency identification (RFID) tag, and so forth.

The physical layout data 142 may provide information indicative of where inventory locations 106 are in the facility, location of sensors 122 such as the weight sensors 114 and cameras 118, information about sensor orientation and field of view (where applicable), and so forth. For example, the physical layout data 142 may comprise information representative of a map or floor plan of the facility 102 with relative positions of inventory locations 106. In some implementations the physical layout data 142 may include planogram data indicative of how types of items 108 are to be arranged at the inventory locations 106, location of the areas associated with particular types of items 108, and so forth. For example, the physical layout data 142 may indicate that area "3" at the inventory location 106 "A394" comprises a rectangular area that extends 20 cm from a right edge of the platform and from front to back of the platform. In some implementations the physical layout data 142 may designate a volume as associated with a particular type of item 108. Continuing the previous example, the volume "3" at the inventory location 106 "A394" may be the area described extending from a surface of the shelf to an underside of a shelf immediately above.

The physical layout data 142 may also comprise information about the type of inventory location 106 in use, information indicative of the physical configuration or placement of weight sensors 114 at a particular inventory location 106, and so forth. For example, the physical layout data 142 may indicate that a particular model of a multi-load cell weighing shelf is in use at a particular inventory location 106. Using this information, data about the relative position of the load cells with respect to the shelf may be retrieved.

The historical data 144 may comprise one or more of previously determined event data, interaction data 148, and so forth. For example, the historical data 144 may comprise the interaction data 148 determined since the facility 102 opened that day. In another example, the historical data 144 may comprise information such as a list of top 100 items 108 that a particular user 126 has purchased. In yet another example, the historical data 144 may indicate interaction data 148 associated with the user 126 since they entered the facility 102. In some implementations the historical data 144 may include data such as observed weights of previously picked or placed items 108. For example, as items 108 of a particular type are picked from or placed to an inventory location 106, observed weight values for those items 108 may be stored. The weight of individual items 108 of the same type may vary. The observed weight values for the items 108 may be used to develop models of the weight for that type of item 108. For example, a probability distribution function for a type of item 108 may be generated based on the observed weight values of that type of item 108.

The cart data 146 comprises information about the items 108 that are determined to be in the custody of the user 126. For example, the cart data 146 may indicate the items 108 that are within the cart 128 that is associated with the account of a first user 126, currently being carried by the first user 126, currently being carried by another user 126 that is associated with the first user 126, and so forth. The cart data 146 may be based at least in part on the interaction data 148. For example, after interaction data 148 indicates user 126(1) picked a quantity of 1 of item type B3949130, the contents of the cart data 146 are updated to include this quantity of this type of item.

The interaction data 148 may include one or more of a type of item 108, a quantity of the type of item 108, a type of interaction, and so forth. The type of interaction may be indicative of whether the interaction comprises one or more of removal of the type of item 108 from the fixture 104, placement of the type of item 108 to the fixture 104, or rummaging involving the type of item 108 at the fixture 104. In some implementations the interaction data 148 may include information about the user 126 who is associated with the interaction. For example, the interaction data 148 may include a user identifier, an account identifier, and so forth.

The interaction module 138 may use the available data to determine a set of hypotheses. For example, based on a weight change as indicated by the weight output data 132, data indicative of a change in the appearance of an area at the fixture 104, and so forth, the interaction module 138 may determine a set of hypotheses that describe various interactions that could involve the types of items 108 associated with that weight change, area, and so forth. These hypotheses may involve single interactions, such as a pick or place of a single item 108, or multiple interactions such as describing a return of one item and a pick of another. These hypotheses may then be assessed based on the other data that is available. For example, touchpoint data that indicates where something like a user's 126 hand cross a threshold of the front of the shelf of the fixture 104 may be used to filter the hypotheses. Continuing the example, if the touchpoint data indicates only touches around the third lane of the shelf, the touchpoint data may be used to disregard those hypotheses that involve interactions at the first and second lanes of the shelf. Likewise, other information as described below may be used to assess the hypotheses. A hypothesis may be selected from the set of hypotheses, and used to generate the interaction data 148.

In another implementation the weight output data 132, image output data 136, or both may be used to determine the first set of hypotheses. As a result, the first set of hypotheses may contain fewer hypotheses than the implementation described above. The confidence values of these hypotheses, or other metrics, may be used to determine a selected hypothesis. The selected hypothesis may then be used to generate the interaction data 148.

A billing module 150 of the inventory management system 112 may use account data 152 and generate user billing data 154 based at least in part on one or more of the cart data 146, or the interaction data 148. For example, the account data 152 may comprise information indicative of one or more payment accounts that are associated with a particular user 126 or user identifier. In some implementations the user 126 may be identified based on presentation of a machine-readable code, using biometric data, and so forth. Once identified, the associated account data 152 may be determined.

The user billing data 154 comprises information indicative of charges that accrue with respect to a particular user identifier, user account, group of user accounts, and so forth. For example, user billing data 154 may be generated that comprises a bill or invoice for the items 108 that have been taken into the custody of the user 126 as indicated by the interaction data 148. Continuing the example, as the user 126 leaves the facility with their cart 128, a list and cost associated with purchase for those items 108 may be determined, taxes or other fees assessed, and that information included in the user billing data 154. The payment account associated with the user 126 may be debited based on the user billing data 154. For example, the invoice total may be charged against a credit card account or bank account of the user 126.

A stock maintenance module 156 may use the interaction data 148 to determine restock data 158. The stock maintenance module 156 may be used to maintain a count of items 108 at the various inventory locations 106. If a quantity on hand at a particular inventory location 106 drops below a threshold level, sales exceed a threshold number of items 108 sold per unit of time, and so forth, the stock maintenance module 156 may generate restock data 158 such as orders to restock the inventory location 106, order more of that type of item 108 from a supplier, and so forth.

As mentioned above, the inventory management system 112 may determine interaction data 148. In some circumstances, low confidence interactions may occur, resulting in interaction data 148 with a confidence value that is low. The inventory management system 112 may attempt to resolve low confidence interactions using a supplemental assessment system. The supplemental assessment system may utilize one or more of human operators, different systems, and so forth to determine what happened with a low confidence interaction. For example, if the inventory management system 112 is unable to assert with a certain confidence value which type of item 108 the user 126 picked, the supplemental assessment system may present at least a portion of the sensor data associated with the interaction to a human operator who may then make a determination and provide input indicative of that determination.

Use of the supplemental assessment system may be limited to reduce latency, cost, and so forth. For example, the use of a human operator introduces a delay in which the sensor data is sent to the human operator, presented, the human operator responds, and the result is returned. Additionally, the human operator may be relatively costly to use. In another example, the supplemental assessment system may require specialized computational hardware, utilize greater computing resources, may introduce delay, and so forth.

By reducing the frequency of low confidence events for which the supplemental assessment system would subsequently be utilized, efficiency of the system 100 may be improved, operational costs decreased, response times may be reduced, and other advantages may be realized. Described in this disclosure are techniques to process data from various sensors to determine hypotheses with high confidence values, which may then be used to determine the interaction data 148 and operate the facility. By using these techniques, more of the interactions are able to be assessed and interaction data 148 produced with confidence values above a threshold level, reducing the number of interactions that would otherwise be assessed by the supplemental assessment system.

Figure 2:
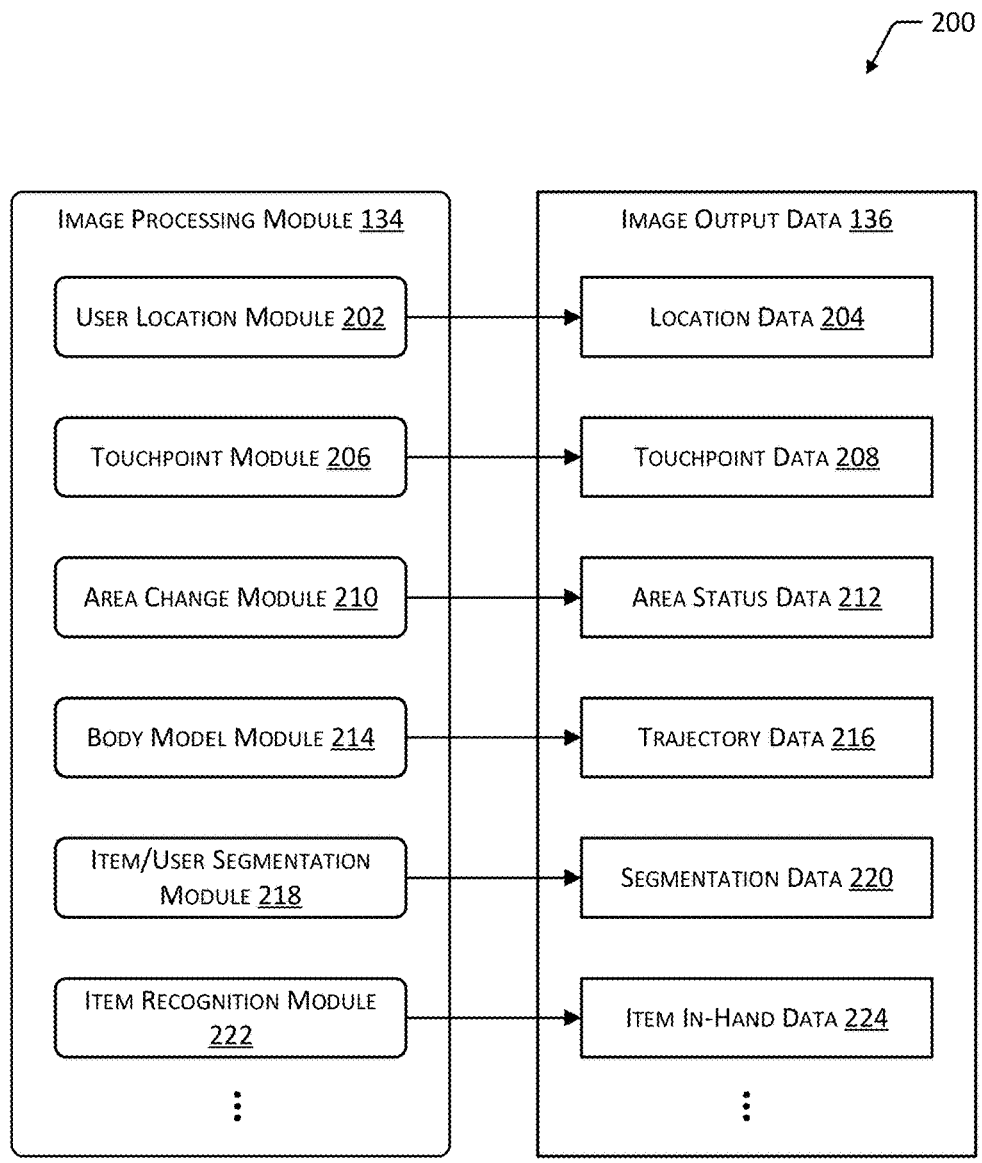
FIG. 2 is a block diagram of an image processing module and the corresponding image output data that may be used to determine the interaction data, according to some implementations.

FIG. 2 is a block diagram 200 of the image processing module 134 and the corresponding image output data 136 that may be used to determine the interaction data 148, according to some implementations. One or more of the modules in the image processing module 134 may implement, at least in part, one or more of the following tools or techniques available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 124. In still another implementation, functions such as those in the Machine Vision Toolbox for Matlab (MVTB) available using MATLAB as developed by Math Works, Inc. of Natick, Mass., USA, may be utilized. Other libraries, functions, or tools may be utilized as well.

In some implementations the image data 120 may include depth data. For example, the depth data may indicate that a particular pixel or group of pixels is at some distance from the camera 118. The image processing module 134 may use this depth data, as well as visible light images, infrared images, and so forth during operation of the following modules.

A user location module 202 may be used to determine location data 204 of users 126 in the facility 102. In one implementation the user location module 202 may utilize the image data 120 and information about the location and FOV of the camera 118 that provided the image data 120 to determine a presence of a user 126 in the image, and the position of the user 126 with respect to the facility 102. As the user 126 moves about the facility 126, the user location module 202 may provide location data 204 indicative of the location, with respect to the facility 102, of the user 126. The user location module 202 may provide location data 204 be indicative of a location of a centroid of the user 126, or a location of a particular part of the user 126 such as a location of a head of a user 126, location of a hand of a user 126, and so forth. In other implementations the user location module 202 may use data from other sensors to determine the location data 204. For example, a smart floor may be used to determine the location data 204. In some implementations the user location module 202 may also determine the location of other objects, such as carts 128, items 108, and so forth.

A touchpoint module 206 determines touchpoint data 208. The touchpoint module 206 may use the image data 120 to determine if an object has passed a threshold or boundary that is associated with an inventory location 106. For example, the touchpoint module 206 processes image data 120 that includes images from an overhead camera 118 that is looking down on the fixture 104. An edge detection algorithm or manual input may be used to determine a front edge of a shelf at the fixture 104. The touchpoint module 206 may use a change detection algorithm to determine if the portion of the images that are associated with the front edge of the shelf have changed from a first time to a second time. The portions of the image that exhibit a change may then be associated with a particular location with respect to the fixture 104 and the inventory location 106 therein. For example, in the overhead view the touchpoint data 208 may indicate a distance along a single dimension, such as from left to right along the fixture 104, of the change. In another example, the view of the cameras 118 used to provide image data 120 to the touchpoint module 206 may be able to provide data along two axes (two dimensional coordinates), such as left to right along the fixture 104 and height with respect to the fixture 104. In yet another example, the touchpoint module 206 may provide data along three axes, providing three-dimensional touchpoint data 208. The touchpoint data 208 may be indicative of deliberate touches, such as a hand, or accidental touches such as an elbow of the user 126 passing by, or an edge of the cart 128 that strays too close to the fixture 104. In other implementations other sensors may be used to determine touchpoint data 208. For example, a light curtain, proximity sensor, and so forth may be used to determine the touchpoint data 208.

An area change module 210 may use the image data 120 to determine area status data 212. As described above, an inventory location 106 may be divided up into several different areas, such as lanes. The area status data 212 is indicative of whether a change in the appearance of a particular area has taken place from a first time to a second time. The area change module 210 may use a change detection algorithm to compare at least a portion of two or more images acquired at different times. If the change in the images exceeds a threshold value, a change may be determined. For example, if an item 108 is removed from a lane on the shelf, the difference in appearance between images acquired before and after would result in area status data 212 indicative of a change.

A body model module 214 may process the image data 120 and determine information about the user 126 such as orientation, position of torso body, position of limbs, position of hands, location of shoulders, and so forth. For example, the body model module 214 may use a skeleton tracking algorithm to determine the arrangement of the body of the user 126. The body model module 214 may provide location data about particular parts of the body, such where one or more hands are in the facility 102 with respect to the inventory location 106, and so forth. Based on the change in location over time of a particular part of the body of the user 126, data about the location of the particular part of the body as produced by the body model module 214 may be used to provide trajectory data 216, indicative of change by the particular part of the body from one location to another over time. For example, the trajectory data 216 may indicate the location of the hand(s) of the user 126 over time, and location such as whether the hand is within a threshold distance or within the inventory location 106, the cart 128, another user 126, and so forth. The trajectory data 216 may maintain an association with a particular user 126. For example, the trajectory data 216 may indicate that the right hand of user 126(2) moved to the shelf while the hands of the user 126(1) were not near the shelf at the time.

The trajectory data 216 may be used to select a hypothesis. For example, if the trajectory data 216 indicates the hand of the user 126 moved inside a volume associated with an inventory location 106 for a particular type of item and then moved out and to within a volume associated with a cart 128, those hypotheses involving a pick action may exhibit a greater confidence value while hypotheses involving a place action may exhibit a lower confidence value. In another example, by maintaining the association of hands with particular users 126, the trajectory data 216 may be used to determine that two or more users 126 had their hands at the inventory location 106 at about the same time, resulting in the assessment of hypotheses involving multiple simultaneous interactions.

The trajectory data 216 may be used to provide information as to the particular area in the inventory location 106 that the user 126 interacted with. For example, the trajectory data 216 may provide location data that indicates the hand was within a first area of the inventory location 106 during a particular time. This information may be used to determine hypotheses or evaluate hypotheses.

An item/user segmentation module 218 processes image data 120 to determine where at least a portion of the user 126 is and where an object such as an item 108 in hand is. For example, the item/user segmentation module 218 may generate segmentation data 220 that designates a first boundary in an image around an arm, head, shoulders, and other body parts of a user 126 visible in the image, and a second boundary around an object such as an item 108 that is being held. The item/user segmentation module 218 may use data from other modules to operate. For example, the body model module 214 may provide information such as where the hand of the user 126 is within a particular image. The item/user segmentation module 218 may then determine that an area in the image proximate to the hand differs from an expected background, and determine a boundary around that different area. In some implementations the image data 120 may include depth data. If an object is detected near the hand and at the same distance as the hand, the item/user segmentation module 218 may use this depth data to determine and segregate the two. In some implementations the segmentation data 220 may comprise a cropped image that includes the detected item 108 as delineated by the boundary for that item.

The segmentation data 220 may be used to determine hypotheses, assess hypotheses, and so forth. In one implementation, the image data 120 of a first area of the fixture 104 that is associated with an event is obtained. The event may be a weight change event, area status data 212 indicating a change at an area, touchpoint data 208, and so forth. Based on first image data 120, the item/user segmentation module 218 may determine that a hand of a user 126 is empty at a first time and then is holding an item at a second time. A candidate item set may be determined based on the one or more types of items 108 associated with the first area of the fixture 104. For example, the types of items associated with the area indicated by the area status data 212 where a change was detected may be retrieved and used to generate the candidate item set. As Hypotheses may then be generated based at least in part on the candidate item set that are constrained to hypotheses involving removal of the one or more types of items 108 from the fixture 104.

The item recognition module 222 may operate in conjunction with, or using information from, other modules. For example, the item/user segmentation module 218 may provide the cropped image of the item 108 in the hand of the user 126. The item recognition module 222 may then process this cropped image to generate item in-hand data 224 that is indicative of the type of item 108 that is in the hand of the user 126.

The item recognition module 222 may be configured to determine item-in hand data 224 that is indicative of a type of item 108 that is being held or carried by the user 126 based on sensor data. In some implementations the item recognition module 222 may provide data indicative of a count of the items 108 that are in-hand. For example, the item recognition module 222 may use one or more neural networks to process a visible-light image to recognize a particular type of item 108 in the image. In another example, the item recognition module 222 may use image data 120 that includes infrared images. The infrared images may include a machine-readable code, such as a matrix or two-dimensional barcode, that contains information encoding the stock keeping unit (SKU) identifier indicative of the type of item 108.

The item recognition module 222 may also use data indicative of area, such as touchpoint data 208, area status data 212, trajectory data 216, and so forth to determine a set of possible types of items 108. The item recognition module 222 may use this relatively small set of possible types of items 108 to improve accuracy. For example, if the set of possible types of items 108 includes three different types of items, the item recognition module 222 may be able to provide a high confidence determination as to the type of item 108 in less time and using fewer computational resources that a comparison involving a larger set, such as all of the types of items 108 at a particular fixture 104.

Figure 3:
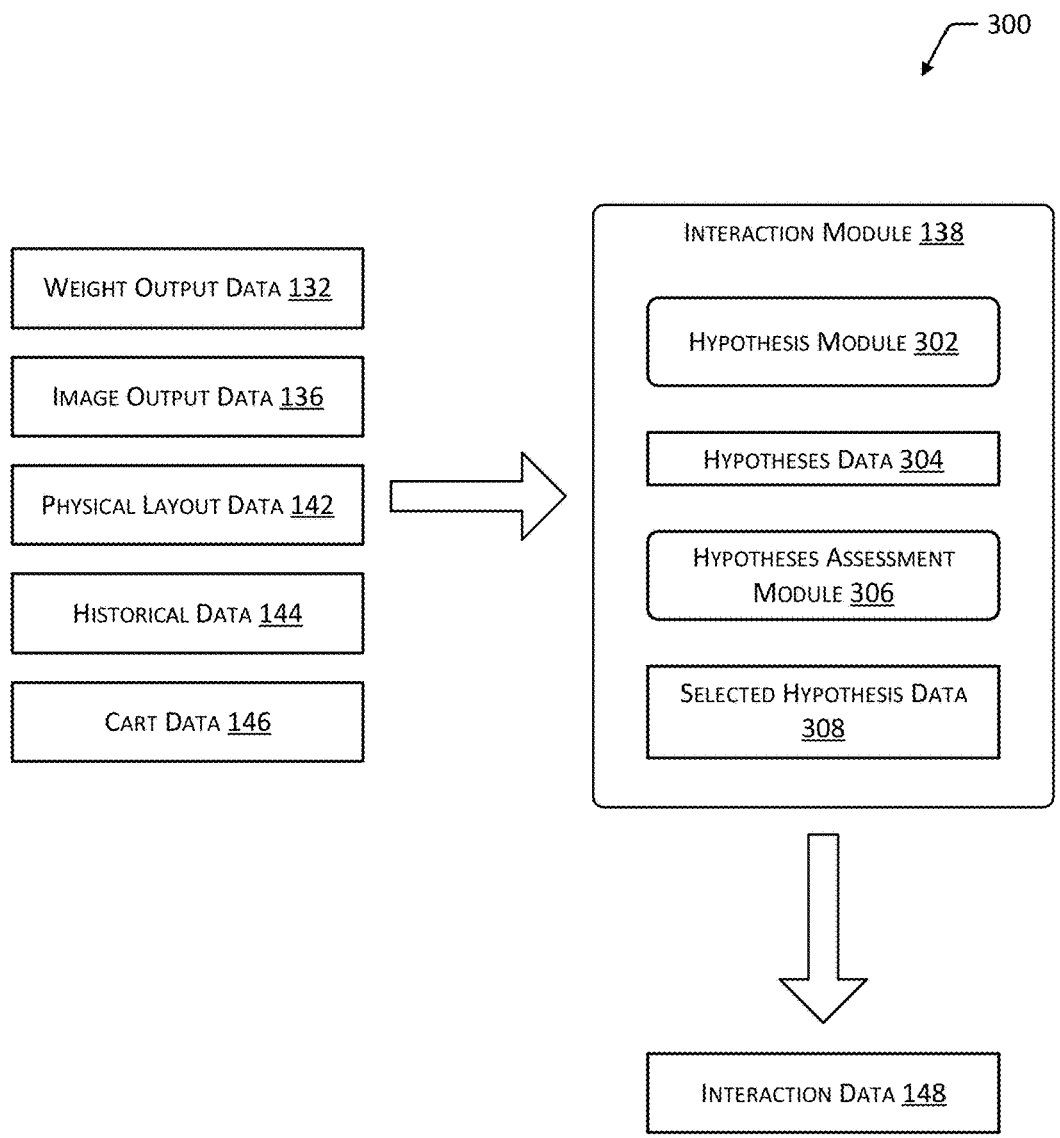
FIG. 3 is a block diagram of an interaction module that uses various data to determine the interaction data, according to some implementations.

FIG. 3 is a block diagram 300 of an interaction module 138 that uses various data to determine the interaction data 148, according to some implementations. As described above, the interaction module 138 may use as input one or more of weight output data 132, image output data 136, physical layout data 142, historical data 144, cart data 146, and so forth.

The interaction module 138 may include a hypothesis module 302 that generates hypotheses data 304 and a hypotheses assessment module 306 that generates selected hypothesis data 308. The interaction module 138 then generates the interaction data 148 from the selected hypothesis data 308. The hypotheses data 304 may include confidence values for the respective hypotheses. The hypotheses assessment module 306 may select the hypothesis with the greatest confidence value as the selected hypothesis data 308. In some implementations one or more criteria may be used to determine the selected hypothesis data 308. For example, the selected hypothesis may be the hypothesis that exhibits a confidence value that exceeds a threshold value, has a difference between a first ranked hypothesis and a second ranked hypothesis that exceeds a threshold value, and so forth.

The hypothesis module 302 is configured to use at least a portion of the input to determine the hypotheses data 304, such as a first set of hypotheses. For example, the hypothesis module 302 may use the weight output data 132 that indicates a −353 gram weight change occurred at a particular shelf between a first time and a second time. In another example, the hypothesis module 302 may use the area status data 212 to indicate a change at the shelf between a second time and a third time. The hypothesis module 302 may access physical layout data 142 and retrieve the types of items 108 that are designated as being stowed at the shelf. The hypotheses data 304 may then be generated that include hypotheses of various combinations of those types of items 108, quantities, picks, places, and so forth that are consistent with that weight change.

The hypothesis module 302 may generate hypotheses data 304 that is constrained. For example, the hypothesis module 302 may be constrained to generate hypotheses that involve fewer than 15 items 108, or have fewer than five consecutive pick/return actions.

The hypothesis module 302 may use the input to constrain the hypotheses that are included in the hypotheses data 304. For example, if the area status data 212 indicates a change at a particular area associated with a particular type of item 108, the hypothesis module 302 may generate hypotheses data 304 having hypotheses that only involve that type of item 108.

A hypotheses assessment module 306 may use one or more of the various data described above to assess the hypotheses in the hypotheses data 304 and determine selected hypothesis data 308 that includes a selected hypothesis. The selected hypothesis may then be used to generate the interaction data 148.

The hypotheses assessment module 306 may compare the various conditions indicated by the hypotheses to the data obtained to determine which hypotheses to consider or disregard, to change confidence values, and so forth. For example, if the location data 204 indicates that user 126(1) was 1 meter from the inventory location 106(1) while user 126(2) was 10 meters away at the time of the event, the hypotheses involving user 126(2) may be disregarded. In another example, if the touchpoint data 208 indicates that a touch took place at area 3 of the inventory location 106, those hypotheses associated with other areas may have their confidence values decreased. In yet another example, if the area status data 212 indicates a change at area 2 of inventory location 106(1), then those hypotheses associated with other inventory locations and/or areas may be decreased.

The hypotheses assessment module 306 may use the trajectory data 216, item in-hand data 224, and so forth to determine the selected hypothesis data 308. For example, if the trajectory data 216 indicates the hand of the user 126(1) passed into the inventory location A394, area 3 and then moved to the cart 128, the hypotheses assessment module 306 may increase the confidence value of those hypotheses that involve that inventory location and area.

The hypotheses assessment module 306 may use the historical data 144 to generate the interaction data 148. For example, the historical data 144 indicating the type of items 108 that have been previously picked by the user 126 may be used to disambiguate between two hypotheses with similar scores. For example, if the user 126 has a history of picking a "turkey sandwich" and the top two hypotheses involve a "ham sandwich" and a "turkey sandwich", the hypothesis that is selected may be the one that involves the "turkey sandwich" type of item 108.

The cart data 146 may be used by the interaction module 138. In one implementation, the hypothesis module 302 may access cart data 146 that is indicative of one or more types of items 108 that are deemed to be in custody of the user 126 before an event. The event may comprise one or more of a weight change event determined by the weight processing module 130 or a change detected by the area change module 210. By using the cart data 146 the set of possible hypotheses may be reduced. For example, if the interaction is determined to be a return, such as due to an increase in weight on the shelf, the hypotheses generated may be for returns of those items indicated in the cart data 146 for that particular user 126. In some implementations, the cart data 146 for users 126, carts 128, and so forth that are within a threshold distance of the inventory location 106 may be used. For example, the location data 204 may be used to determine which users 126 are within a threshold distance of the inventory location 106 at the time of the event. The hypotheses associated with the returns may be limited to those types of items 108 present in the cart data 146 of those users 126 within the threshold distance.

The cart data 146 may also be used to determine if a return is "tidy". A return is "tidy" if an item 108 of a particular type is placed in the area of the inventory location 106 that is designated for that type of item 108. For example, returning the "ham sandwich" item 108 to the lane on the shelf upon which "ham sandwiches" are stowed is a tidy return. In comparison, returning the "turkey sandwich" item 108 to the "ham sandwich" lane would be an untidy return. In one implementation, the cart data 146 may be used by the hypothesis module 302 to determine hypotheses that involve those items expected to be in the custody of the user 126.

In another implementation, the cart data 146 may be used to assess the hypotheses data 304, such as increasing the confidence values of those hypotheses that include items 108 of the same type as that indicated in the cart data 146. Hypotheses that do not include the items 108 of the same type as those in the cart data 146 may still be considered, but may exhibit a lower confidence value.

The cart data 146 may also be used to associate a particular user 126 with a particular interaction. In one implementation, during an interaction involving two users 126, the type of item 108 that has been picked or placed to the inventory location 106 may be determined. For example, a hypothesis associated with the interaction may exceed a threshold confidence value. In the case of a placement of an item 108 to the inventory location 106, if the cart data 146(1) associated with the first user 126(1) indicates a prior presence of the type of item 108, while the cart data 146(2) associated with the second user 126(2) indicates no prior presence of the type of item 108, this interaction may be associated with the first user 126(1). In the case of a pick of a particular type of item 108 from the inventory location 106, if the cart data 146(1) associated with the first user 126(1) indicates the addition of the type of item 108 to the cart 128, while the cart data 146(2) associated with the second user 126(2) indicates no addition of the type of item 108, this interaction may be associated with the first user 126(1).

In some situations, users 126 may include customers who are using the facility 102 and employees who are facilitating operation of the facility 102. For example, a first user 126 who is a customer may be associated with the event data. The location data 204 may indicate that the first user 126 and a second user 126 are within a threshold distance of the inventory location 106 at the time of an event. In this example, the second user 126 may be an employee who is restocking the inventory location 106. The cart data 146 indicative of one or more types of items 108 that are deemed to be in custody of the first user 126 before the event. The hypothesis module 302 may generate hypotheses that involve the types of items 108 associated with the inventory location 106 and involve the first user 126 and the second user 126. However, these hypotheses involve the return of an item 108 type that is not found in the cart data 146 of the first user 126. As a result, those hypotheses involving the first user 126 may be removed from consideration, have their confidence values reduced, and so forth. Continuing the example, the selected hypothesis data 308 may involve a hypothesis that involves the second user 126 returning an item 108 to the inventory location 106.

The interaction module 138 may use data from different sensors to improve overall accuracy of the system and provide hypotheses with greater confidence values, resulting in more confidence interaction data 148. For example, the interaction module 138 may process the weight data 116 produced by weight sensors 114 under a shelf to determine that a weight change event occurred between a first time and a second time. The weight data 116 may be noisy as a result of movement in the facility 102, users 126 bumping the fixture 104, ongoing movement of the shelf, and so forth. As a result, hypotheses that are based solely on weight change may have a relatively low confidence. The interaction module 138 may process the image data 120 obtained at or proximate in time to the first time and the second time. For example, the area change module 210 may determine area status data 212 that indicates a particular area of the inventory location 106 exhibited a change. The area status data 212 may indicate the change took place between a third time and a fourth time, where the third time and the fourth time are between the first time and the second time. In another example, the touchpoint data 208 may indicate activity between the third time and the fourth time at the particular area. By using the area status data 212, the touchpoint data 208, or both, the interaction module 138 is able to narrow down the determination of hypotheses or the assessment of those hypotheses to the area which exhibited the change and the corresponding type(s) of item 108 associated with that area. Likewise, the weight data 116 corresponding to the third and the fourth time may be used for determining what type of item 108 was involved in the interaction and the quantity of the type of item 108, removing potentially noisy weight data 116 obtained from the first time to the third time and from the fourth time to the second time. As a result, the use of the area status data 212 eliminates consideration of the potentially erroneous weight data 116 that may occur before or after the interaction took place as detected by the area change module 210.

The touchpoint data 208, area status data 212, trajectory data 216, and so forth may be used to process hypotheses that involve multiple users. For example, many users 126 may be interacting with the same inventory location 106 or perhaps area on that inventory location 106. The hypotheses assessment module 306 may remove from consideration an otherwise high-ranking hypothesis that is not consistent with the different areas that are indicated as having activity at that time.

The hypotheses assessment module 306 may use the area status data 212 to determine the selected hypothesis data 308. For example, if the area status data 212 indicates that an interaction took place at inventory location A393, area 4, the hypotheses that do not include this inventory location 106 and area may be omitted from further consideration. Likewise, other data such as touchpoint data 208, trajectory data 216, and so forth may be used. By combining the various types of data, the confidence in the resulting interaction data 148 may be significantly increased. For example, if the area status data 212 indicates a change at a particular area of an inventory location 106 while the trajectory data 216 indicates the presence of a hand at that area proximate to the time of that change, the selected hypothesis data 308 may have a high confidence value.

The hypotheses assessment module 306 may use one or more rules to further improve the confidence in the selected hypothesis data 308. These rules allow the system 100 to accommodate various real-world situations by producing high confidence hypotheses under certain circumstances.

As described above, a fixture 104 may include one or more inventory locations 106. Those inventory locations 106 may be divided into areas that are associated with particular types of items 108. The hypotheses assessment module 306 may increase the confidence values for those hypotheses that involve interactions with different areas or inventory locations 106 that involve the same type of item 108. For example, a first hypothesis may specify a pick of a quantity of 1 of a "ham sandwich" from inventory location 106(1), area 2 while a second hypothesis specifies a pick of a quantity of 1 of a "ham sandwich" from inventory location 106(1), area 3 that is immediately adjacent to area 2. Or, the location associated with the pick may be uncertain, and as a result the location of the hypothesis includes at least a portion of two or more areas. The interaction module 138 may select either of these hypotheses to be represented in the interaction data 148. Because the possible areas contain the same type of item 108, the particular area from which the item 108 was taken may not be deemed significant, particularly for the determination of the user billing data 154. Said another way, for the purposes of billing, the system 100 may require high confidence in what (the type of item 108) and not necessarily from where (the area) that the item 108 was picked from.

The interaction module 138 may produce interaction data 148 that is highly confidence with respect to the user 126 involved when only a single user 126 is present within a threshold distance of an inventory location 106. For example, if the location data 204 indicates the user 126 is present 0.3 m from the inventory location 106, and nobody else is detected within 5 m of the inventory location 106, a hypothesis that is uncertain as to the identity of the person who picked the item 108 may have the confidence value increased as there is no one else around to have picked the item 108. As a result, a hypothesis that would otherwise have been low confidence may be elevated to high confidence.

In some situations, a user 126 may be part of a group, such as bringing a guest to the facility 102. The hypotheses assessment module 306 may increase the confidence values for those hypotheses that involve interactions involving members of that group, without concern for who in that group specifically performed the interaction. For example, a user 126 may bring a friend to the facility 102. The friend may be associated with the payment account of the user 126, such that subsequent actions by the friend would result in user billing data 154 to the user 126. In some situations, the system 100 may have difficulty distinguishing whether the user 126 or the friend performed a pick or place. However, so long as the friend is associated with the user 126 or the payment account of the user 126, such distinction may be deemed not relevant, and the confidence values of these hypotheses may be increased.

It is understood that various combinations of the inputs may be used by the interaction module 138. For example, the interaction module 138 may use one or more of the location data 204, touchpoint data 208, area status data 212, trajectory data 216, segmentation data 220, item in-hand data 224, the weight output data 132, the physical layout data 142, the historical data 144, the cart data 146, and so forth during operation to determine the interaction data 148.

By producing interaction data 148 that has a high confidence of accurately representing an actual interaction in the facility 102, the interaction module 138 improves the overall operation of the system 100. For example, interaction data 148 resulting from a selected hypothesis with a high confidence value may be used to generate the user billing data 154 and so forth. In comparison, interaction data 148 that results from a selected hypothesis with a low confidence value may require additional processing. For example, a low confidence hypothesis may result in sensor data being assessed by a human operator. Additionally, the techniques described are resistant to spurious events. For example, weight data 116 that is spurious may be checked against the location data 204, area status data 212, and so forth. If no user 126 is within a threshold distance and no visible change was observed at the area(s) associated with the weight data 116, the spurious weight data 116 may be disregarded.

Figure 4:
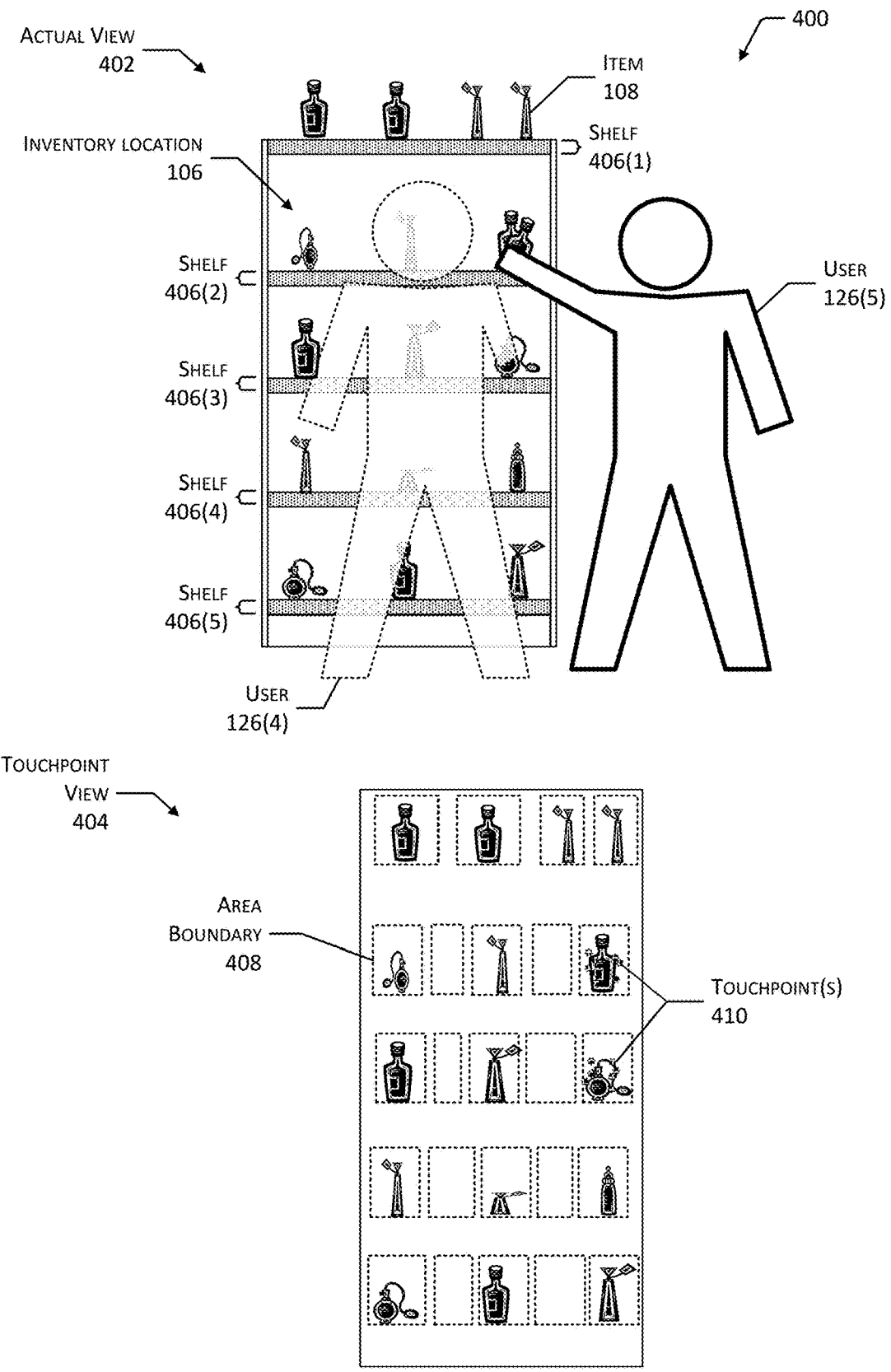
FIG. 4 illustrates views of users interacting with a fixture and corresponding touchpoints, according to one implementation.

FIG. 4 illustrates views 400 of users 126 interacting with a fixture 104 and corresponding touchpoints, according to one implementation. An actual view 402 is shown as well as a touchpoint view 404 that is representative of touchpoint data 206. The actual view 402 shows the fixture 104 with five shelves 406(1)-(5). Each shelf 406 acts as an inventory location 106 that supports one or more types of items 108. In this illustration, user 126(4) is reaching for an item 108 in the fifth area (lane) of shelf 406(3) while user 126(5) is reaching for an item 108 in the fifth area of shelf 406(2). As their respective hands move past a specified point, such as a front edge of the respective shelves 406, touchpoint data 208 is generated.

The touchpoint view 404 depicts area boundaries 408. The area boundaries 408 may describe the area or volume that is associated with a particular lane on the shelf 406. For example, the physical layout data 142 may specify a particular volume within which one or more types of items 108 are designated as being stowed. In this illustration, the touchpoint data 208 provides information indicative of a location of a touch or penetration of the threshold in two dimensions, that is the position of the touchpoint 410 with respect to the width of the fixture 104 and the height of the fixture 104.

By using the touchpoints 410, the interaction module 138 is able to disambiguate between interactions at different areas of the same inventory location 106, such as different lanes on the same shelf 406, between multiple users 126 interacting with one shelf 406 above or below another, and so forth.

Figure 5:
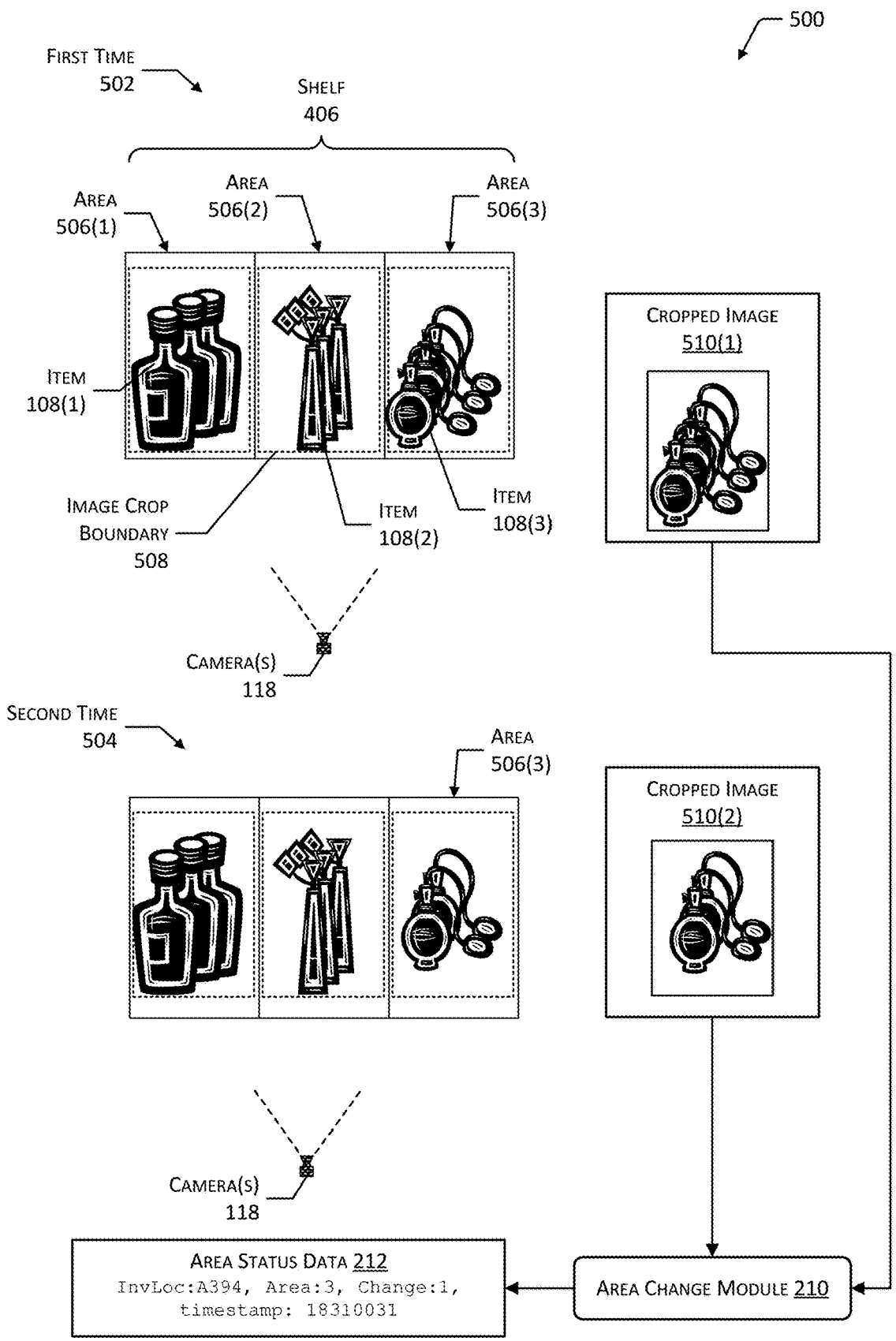
FIG. 5 illustrates cropped images of an area at an inventory location acquired at different times being used to determine area status data, according to one implementation.

FIG. 5 illustrates generation of cropped images of an area at an inventory location 106 acquired at different times being used to determine area status data 212, according to one implementation. One or more cameras 118 may have a FOV that includes at least a portion of an inventory location 106. For example, as depicted here, a camera 118 may have a FOV that includes at least a portion of a shelf 406. The shelf 406 is shown at a first time 502 and a second time 504. This shelf 406 has three areas 506(1), 506(2), and 506(3). In this illustration, each area 506 stows a different type of item 108. However, in other implementations a given area 506 may be used to stow more than one type of item 108.

An image crop boundary 508 is designated for each of the areas 506. For example, as shown here the image crop boundary 508 may be parallel to the boundary of the area 506. A cropped image 510 is provided that comprises an image of the inventory location 106 that is within the image crop boundary 508. For example, in this illustration the cropped image 510(1) is of the third area 506(3) that is designated as stowing items of type 108(3).

In one implementation the camera 118 may generate the cropped image 510. In another implementation, the image data 120 may comprise a full-frame image that is then cropped by an intermediate module or by the area change module 210.

At the second time 504, an item has been removed from the area 506(3). A cropped image 510(2) has been acquired at this time and provided to the area change module 210. The area change module 210 may operate as described above. For example, the area change module 210 may determine if the change between the cropped image 510(1) obtained at the first time 502 and the cropped image 510(2) obtained at the second time 504 exceeds a threshold value. In this example, the area change module 210 has produced area status data 212 that is indicative of a status of a change. Continuing the example, the area status data 212 indicates the inventory location 106, the area in that area location, a binary value of 1 indicating a change has taken place, and a timestamp that is indicative of when the change was determined. For example, the timestamp may be indicative of the second time 504.

Figure 6:
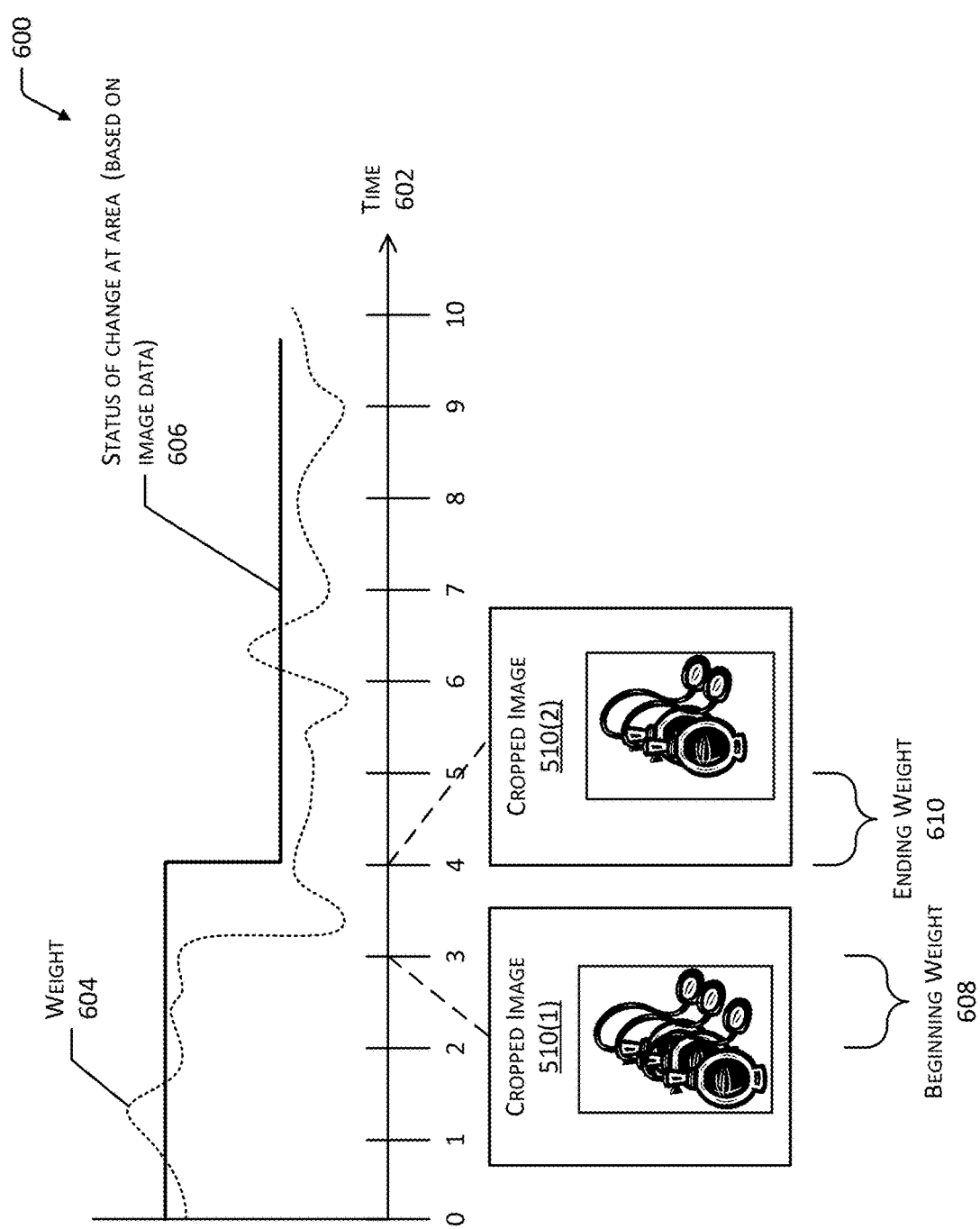
FIG. 6 illustrates a graph of weight over time and detection of a change based on the cropped images, according to one implementation.

FIG. 6 illustrates a graph 600 over time 602 of weight 604 and status of a change at an area 606 based on the cropped images 510, according to one implementation. For example, the weight 604 may comprise weight output data 132 that is based on the weight data 116 as processed by the weight processing module 130. The weight 604 may be measured on the shelf 406 or other inventory location 106 at different times. As items 108 or other objects are picked or placed to the shelf 406, the weight 604 changes. Other factors such as local vibration, touches of the hand of the user 126, and so forth may also produce changes in weight 604. As depicted the weight 604 varies, and exhibits a decrease after time 602 of 3. After this time, there are some further variations. If used alone by the interaction module 138 to determine the interaction data 148, this relatively noisy weight 604 may result in low confidence hypotheses and ultimately low confidence interaction data 148. However, other data such as the area status data 212 may be used to improve the confidence values.

Also depicted is a representation of the status of a change at an area 606 as produced by the area change module 210, such as provided by area status data 212. In this illustration, the status 606 indicates a change occurring at time 602 of between 3 and 4, and no change before and after. Information about the time associated with the change indicated by the area status data 212 may be used to select which other data will be used by the interaction module 138. For example, the weight data 116 from before time 602 of 3 may be used to determine a beginning weight 608 while the weight data 116 after time 602 of 4 may be used to determine an ending weight 610. A weight change may be calculated by subtracting the beginning weight 608 from the ending weight 610. The weight difference may then be used by the hypothesis module 302. For example, a first set of hypotheses may be generated based on the weight change. Given the information from the area status data 212 that only a single change took place at one area 506(3) as indicated by the cropped images 510, a weight change associated with the event and the location may be determined while other weight changes or noise in the weight data 116 may be ignored. The performance of the system 100 is improved by reducing or eliminating those hypotheses due to erroneous weight data 116 and by providing additional data indicative of the area 506 of the inventory location 106 that is associated with the event.

Figure 7A:
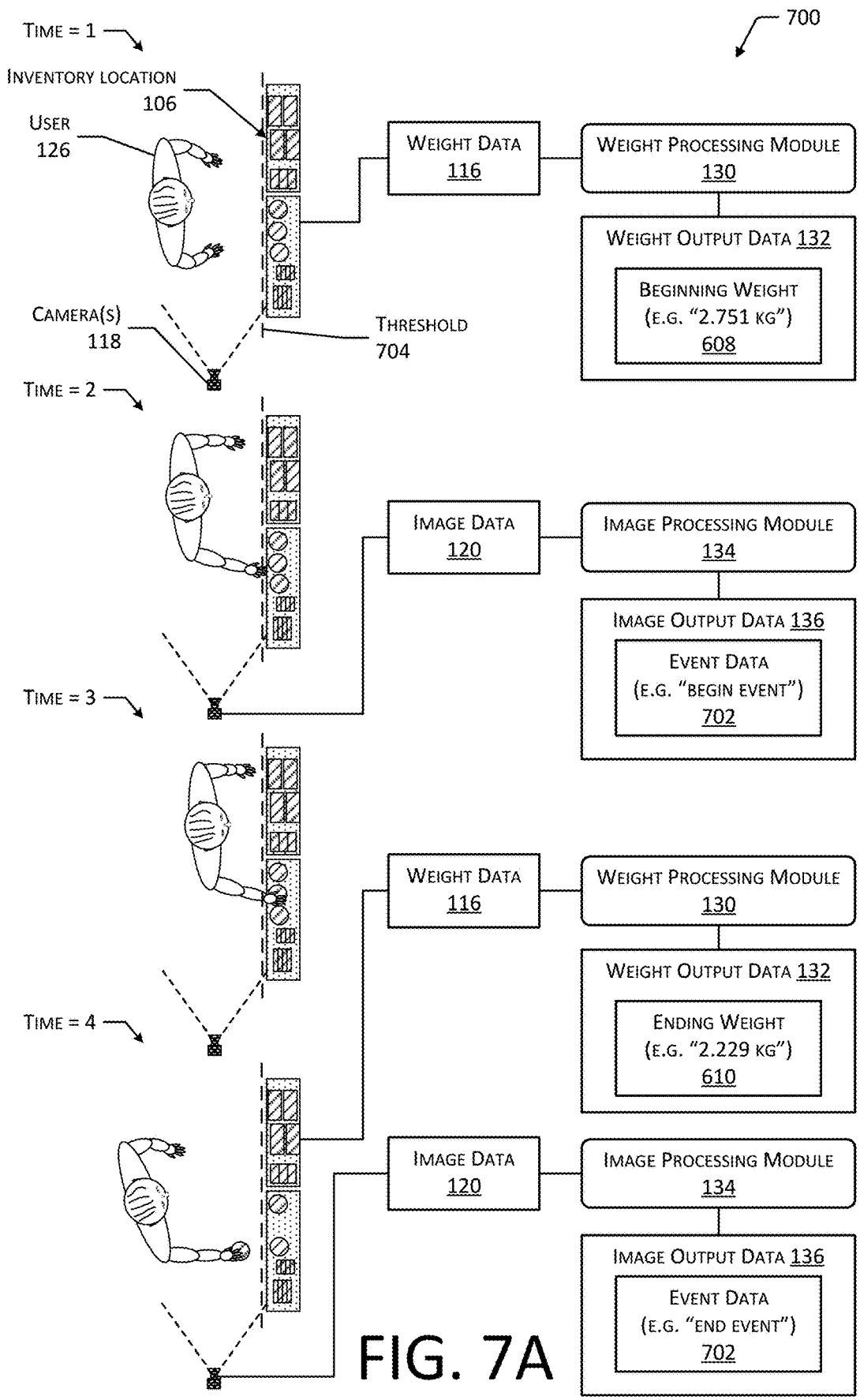
FIGS. 7A and 7B illustrates a scenario in which a user interacts with an inventory location over a period of time and weight output data, event data, trajectory data, segmentation data, and item in-hand data is generated, according to one implementation.
Figure 7B:
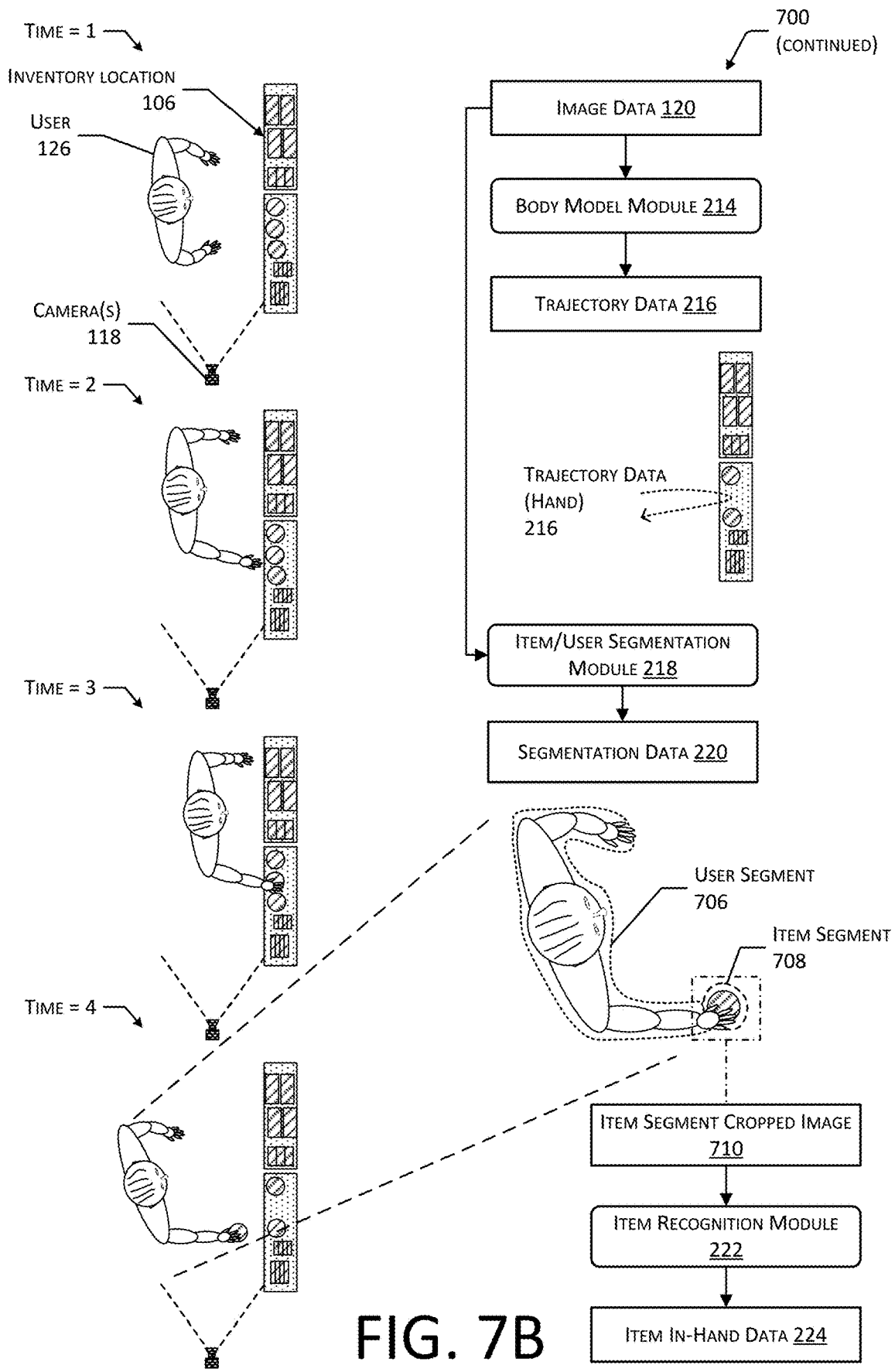

FIGS. 7A and 7B illustrate a scenario 700 in which a user 126 interacts with an inventory location 106 over a period of time and data generated that may be used by the interaction module 138, according to one implementation. In this scenario as shown in FIGS. 7A and 7B, at time=1, the user 126 approaches an inventory location 106 at a fixture 104. One or more cameras 118 have fields of view that include at least a portion of the inventory location 106. At time=2, the user 126 reaches a right hand towards an item 108 stowed at the inventory location 106. At time=3, the right hand of the user 126 enters the area 506 and grasps an item 108. At time=4 the right hand of the user 126 is withdrawn from the inventory location 106, holding the item 108. During these times, the cameras 118 have been providing image data 120 to the inventory management system 112.

At shown in FIG. 7A, the weight data 116 is obtained at various times and processed by the weight processing module 130. For example, the weight data 116 obtained at time=1 is processed by the weight processing module 130 to generate weight output data 132 such as beginning weight 608.

At time=2 the image data 120 is processed by the image processing module 134 to generate image output data 136, such as event data 702 indicative of a beginning of an event. For example, the image data 120 may indicate that at time=2 the user's 126 hand has passed a threshold 704 that is designated in front of the inventory location 106.

At time=3 the user 126 completes grasping the item 108 and begins to remove their hand. During this time, the weight data 116 obtained by the weight sensors 114 at the inventory location 106 may be noisy due to ringing, vibration, or other effects.

At time=4 the user 126 has removed their hand 126 back past the threshold 704. Based on the image data 120, the image processing module 134 has determined image output data 136, such as event data 702 indicative of an ending of the event. With the hand of the user 126 removed, the user 126 is no longer interacting with the inventory location 106. The weight processing module 130 may use the weight data 116 obtained at or after time=4 to generate weight output data 132 such as the ending weight 610.

The beginning weight 608 may be subtracted from the ending weight 610 to determine a weight change. The weight change may then be used by the interaction module 138. For example, the hypothesis module 302 may use the weight change to determine the hypotheses data 304. The event data 702 may also include data indicative of the area 506 at which the event took place. This data may also be used by the interaction module 138. For example, the hypothesis module 302 may generate hypotheses that are associated with the types of items 108 that are indicated by the physical layout data 142 as being stowed at the area 506 at which the event took place.

At illustrated in FIG. 7B, the image data 120 may be further processed to determine other information. The image data 120 may be processed by the body model module 214 as described above to generate trajectory data 216. In this illustration the trajectory data 216 depicts the motion of the hand from time=1 to 4, showing the path of the hand into the area 506 and back out.

Also shown is the item/user segmentation module 218 that generates the segmentation data 220. As illustrated here, a user segment 706 may be determined that describes where in the image the user 126 is determined to be, while an item segment 708 is determined that describes where in the image the item 108 is.

The segmentation data 220 may be used in several ways. The segmentation data 220 may be used to determine if there is an object in the hand of the user 126. For example, if the segmentation data 220 indicates no item segment 708, the user's 126 hand may be deemed empty. Likewise, if the segmentation data 220 indicates the presence of an item segment 708, the user's hand may be deemed to be holding an object. This data may be used by the interaction module 138 to determine hypotheses, assess hypotheses, and so forth. For example, if the segmentation data 220 indicates no object in the hand of the user 126 before and after an event, the interaction module 138 may decrease the confidence value of hypotheses that involve a pick or a place.

The segmentation data 220 may be used to generate an item segment cropped image 710 that comprises a portion of the image data 120 that depicts the item 108 that is being held by the user 126. The item segment cropped image 710 may be used as input to the item recognition module 222 which may then generate the item in-hand data 224.

By using this information, the interaction module 138 is able to provide higher confidence interaction data 148 that improves operation of the facility 102.

Figure 8:
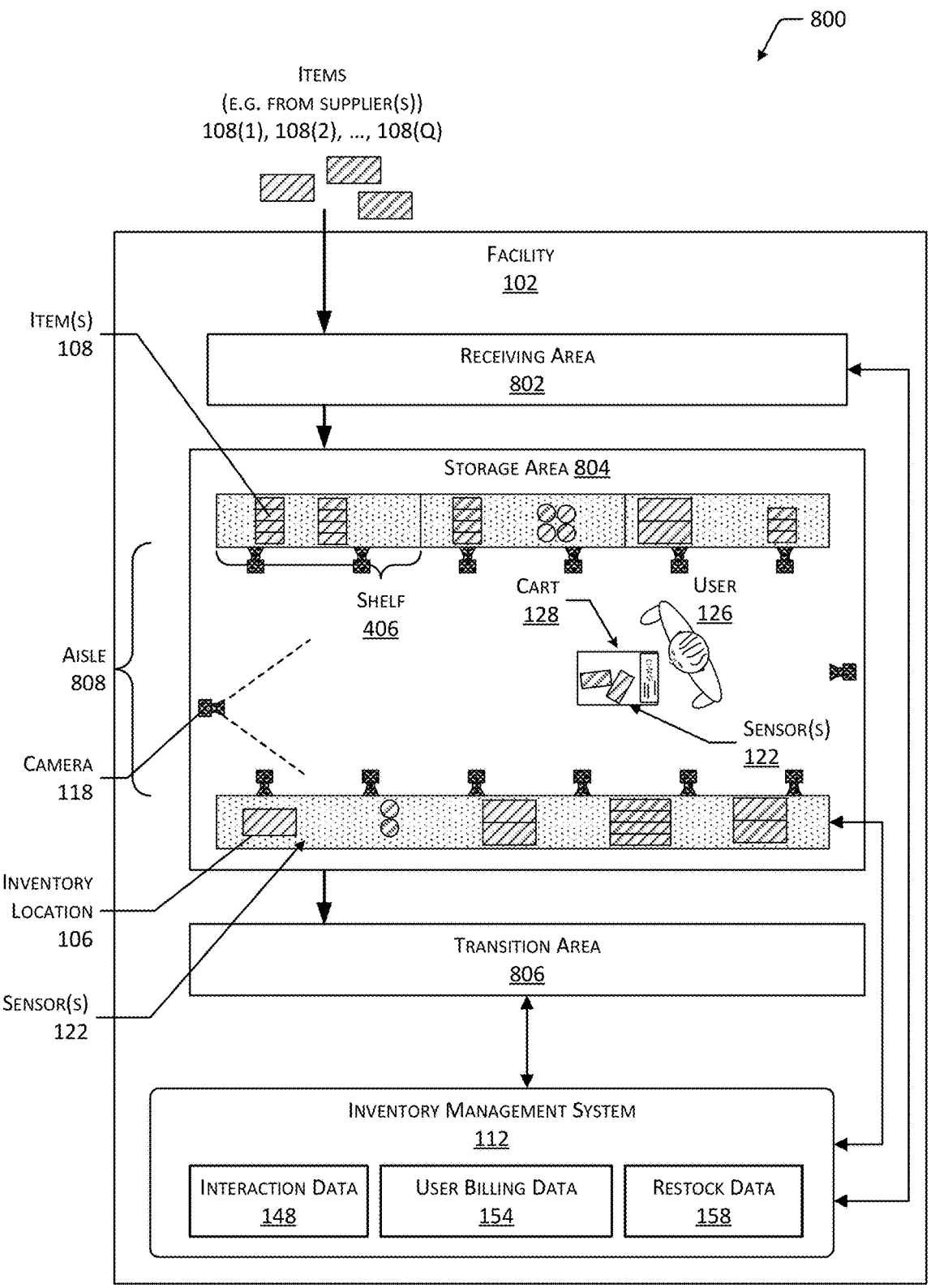
FIG. 8 is a block diagram illustrating a materials handling facility (facility) using the system, according to some implementations.

FIG. 8 is a block diagram 800 illustrating a materials handling facility (facility) 102 using the system 100, according to some implementations. The facility 102 comprises one or more physical structures or areas within which one or more items 108(1), 108(2), . . . , 108(Q) may be held. As used in this disclosure, letters in parenthesis such as "(Q)" indicate an integer value greater than or equal to zero. The items 108 may comprise physical goods, such as books, pharmaceuticals, repair parts, electronic gear, and so forth.

The facility 102 may include one or more areas designated for different functions with regard to inventory handling. In this illustration, the facility 102 includes a receiving area 802, a storage area 804, and a transition area 806.

The receiving area 802 may be configured to accept items 108, such as from suppliers, for intake into the facility 102. For example, the receiving area 802 may include a loading dock at which trucks or other freight conveyances unload the items 108. In some implementations, the items 108 may be processed, at the receiving area 802, to generate at least a portion of the item data 140. For example, an item 108 may be weighed, imaged or otherwise scanned to develop reference images or representations of the item 108 at the receiving area 802.

The storage area 804 is configured to store the items 108. The storage area 804 may be arranged in various physical configurations. In one implementation, the storage area 804 may include one or more aisles 808. The aisle 808 may be configured with, or defined by, inventory locations 106 on one or both sides of the aisle 808. The inventory locations 106 may include one or more of a shelf, a rack, a case, a cabinet, a bin, a floor location, or other suitable storage mechanisms for holding, supporting, or storing the items 108. For example, the inventory locations 106 may comprise shelves with areas, such as lanes, designated therein. The inventory locations 106 may be affixed to the floor or another portion of the structure of the facility 102. The inventory locations 106 may also be movable such that the arrangements of aisles 808 may be reconfigurable. In some implementations, the inventory locations 106 may be configured to move independently of an outside operator. For example, the inventory locations 106 may comprise a rack with a power source and a motor, operable by a computing device to allow the rack to move from one location within the facility 102 to another.

One or more users 126(1), 126(2), . . . , 126(U) and carts 128(1), 128(2), . . . , 128(T) or other material handling apparatus may move within the facility 102. For example, the user 126 may move about within the facility 102 to pick or place the items 108 in various inventory locations 106, placing them in the cart 128 for ease of transport. The cart 128 is configured to carry or otherwise transport one or more items 108. For example, the cart 128 may include a basket, cart, bag, bin, and so forth. In other implementations, other material handling apparatuses such as robots, forklifts, cranes, aerial drones, and so forth, may move about the facility 102 picking, placing, or otherwise moving the items 108. For example, a robot may pick an item 108 from a first inventory location 106(1) and move the item 108 to a second inventory location 106(2).

While the storage area 804 is depicted as having one or more aisles 808, inventory locations 106 storing the items 108, sensors 122, and so forth, it is understood that the receiving area 802, the transition area 806, or other areas of the facility 102 may be similarly equipped. Furthermore, the arrangement of the various areas within the facility 102 is depicted functionally rather than schematically. For example, in some implementations, multiple different receiving areas 802, storage areas 804, and transition areas 806 may be interspersed rather than segregated in the facility 102.

The facility 102 may include, or be coupled to, the inventory management system 112 described above. The inventory management system 112 is configured to interact with users 126 or devices such as sensors 122, robots, material handling equipment, computing devices, and so forth, in one or more of the receiving area 802, the storage area 804, or the transition area 806.

During operation of the facility 102, the weight sensors 114, cameras 118, and other sensors 122 may be configured to provide sensor data 124, or information based on the sensor data 124, to the inventory management system 112. The sensor data 124 may include weight data 116 obtained from weight sensors 114, image data 120 obtained from cameras 118, and so forth. The sensors 122 may include, but are not limited to, weight sensors 114, cameras 118, radio receivers, depth sensors, and so forth. The sensors 122 may be stationary or mobile, relative to the facility 102. For example, the inventory locations 106 may contain weight sensors 114 to acquire weight data 116 of items 108 stowed therein, cameras 118 to acquire images of picking or placement of items 108 on shelves, and so forth. In another example, the facility 102 may include cameras 118 to obtain images of the user 126 or other objects in the facility 102, such as mounted overhead. The sensors 122 are described in more detail below with regard to FIG. 9.

The inventory management system 112 or other systems may use the sensor data 124 to determine the location of objects within the facility 102, movement of the objects, or provide other functionality. Objects may include, but are not limited to, items 108, users 126, carts 128, and so forth. For example, a series of images acquired by the cameras 118 may indicate removal by the user 126 of an item 108 from a particular location on the inventory location 106 and placement of the item 108 on or at least partially within the cart 128.

The facility 102 may be configured to receive different kinds of items 108 from various suppliers and to store them until a customer orders or retrieves one or more of the items 108. A general flow of items 108 through the facility 102 is indicated by the arrows of FIG. 8. Specifically, as illustrated in this example, items 108 may be received from one or more suppliers, such as manufacturers, distributors, wholesalers, and so forth, at the receiving area 802. In various implementations, the items 108 may include merchandise, commodities, perishables, or any suitable type of item 108, depending on the nature of the enterprise that operates the facility 102.

Upon being received from a supplier at the receiving area 802, the items 108 may be prepared for storage in the storage area 804. For example, in some implementations, items 108 may be unpacked or otherwise rearranged. The inventory management system 112 may include one or more software applications executing on a computer system to provide inventory management functions. These inventory management functions may include maintaining information indicative of the type, quantity, condition, cost, location, weight, or any other suitable parameters with respect to the items 108. The items 108 may be stocked, managed, or dispensed in terms of countable units, individual units, or multiple units, such as packages, cartons, crates, pallets, or other suitable aggregations. Alternatively, some items 108, such as bulk products, commodities, and so forth, may be stored in continuous or arbitrarily divisible amounts that may not be inherently organized into countable units. Such items 108 may be managed in terms of a measurable quantity such as units of length, area, volume, weight, time, duration, or other dimensional properties characterized by units of measurement. Generally speaking, a quantity of an item 108 may refer to either a countable number of individual or aggregate units of an item 108 or a measurable amount of an item 108, as appropriate.

After arriving through the receiving area 802, items 108 may be stored within the storage area 804. In some implementations, like items 108 may be stored or displayed together in the inventory locations 106 such as in bins, on shelves, hanging from pegboards, and so forth. In this implementation, all items 108 of a given kind are stored in one inventory location 106. In other implementations, like items 108 may be stored in different inventory locations 106. For example, to optimize retrieval of certain items 108 having frequent turnover within a large physical facility 102, those items 108 may be stored in several different inventory locations 106 to reduce congestion that might occur at a single inventory location 106.

When a customer order specifying one or more items 108 is received, or as a user 126 progresses through the facility 102, the corresponding items 108 may be selected or "picked" from the inventory locations 106 containing those items 108. In various implementations, item picking may range from manual to completely automated picking. For example, in one implementation, a user 126 may have a list of items 108 they desire and may progress through the facility 102 picking items 108 from inventory locations 106 within the storage area 804 and placing those items 108 into a cart 128. In other implementations, employees of the facility 102 may pick items 108 using written or electronic pick lists derived from customer orders. These picked items 108 may be placed into the cart 128 as the employee progresses through the facility 102.

After items 108 have been picked, the items 108 may be processed at a transition area 806. The transition area 806 may be any designated area within the facility 102 where items 108 are transitioned from one location to another or from one entity to another. For example, the transition area 806 may be a packing station within the facility 102. When the item 108 arrives at the transition area 806, the items 108 may be transitioned from the storage area 804 to the packing station. Information about the transition may be maintained by the inventory management system 112.

In another example, if the items 108 are departing the facility 102, a list of the items 108 may be obtained and used by the inventory management system 112 to transition responsibility for, or custody of, the items 108 from the facility 102 to another entity. For example, a carrier may accept the items 108 for transport with that carrier accepting responsibility for the items 108 indicated in the list. In another example, a user 126 may purchase or rent the items 108 and remove the items 108 from the facility 102. During use of the facility 102, the user 126 may move about the facility 102 to perform various tasks, such as picking or placing the items 108 in the inventory locations 106.

To facilitate operation of the facility 102, the inventory management system 112 is configured to use the sensor data 124, such as weight data 116, image data 120, and other information such as the item data 140, the physical layout data 142, and so forth, to generate interaction data 148. For example, the confidence level associated with a determination that the user 126 has a particular item 108 in their cart 128 may be based on the processes described above with regard to determining the interaction data 148.

The interaction data 148 may provide information about an interaction, such as a pick of an item 108 from the inventory location 106, a place of an item 108 to the inventory location 106, rummaging at the inventory location 106, a touch made to an item 108 at the inventory location 106, a gesture associated with an item 108 at the inventory location 106, and so forth. The interaction data 148 may include one or more of the type of interaction, interaction location identifier indicative of where from the inventory location 106 the interaction took place, item identifier, quantity change to the item 108, user identifier, and so forth. The interaction data 148 may then be used to further update the item data 140. For example, the quantity of items 108 on hand at a particular lane on the shelf may be changed based on an interaction that picks or places one or more items 108.

The inventory management system 112 may combine or otherwise utilize data from different sensors 122 of different types during operation. For example, weight data 116 obtained from weight sensors 114 at the inventory location 106 may be used instead of, or in conjunction with, the image data 120 obtained from cameras 118 to determine the interaction data 148.

As described above, the inventory management system 112 may perform other operations, such as determining user billing data 154, determining restock data 158, and so forth.

Figure 9:
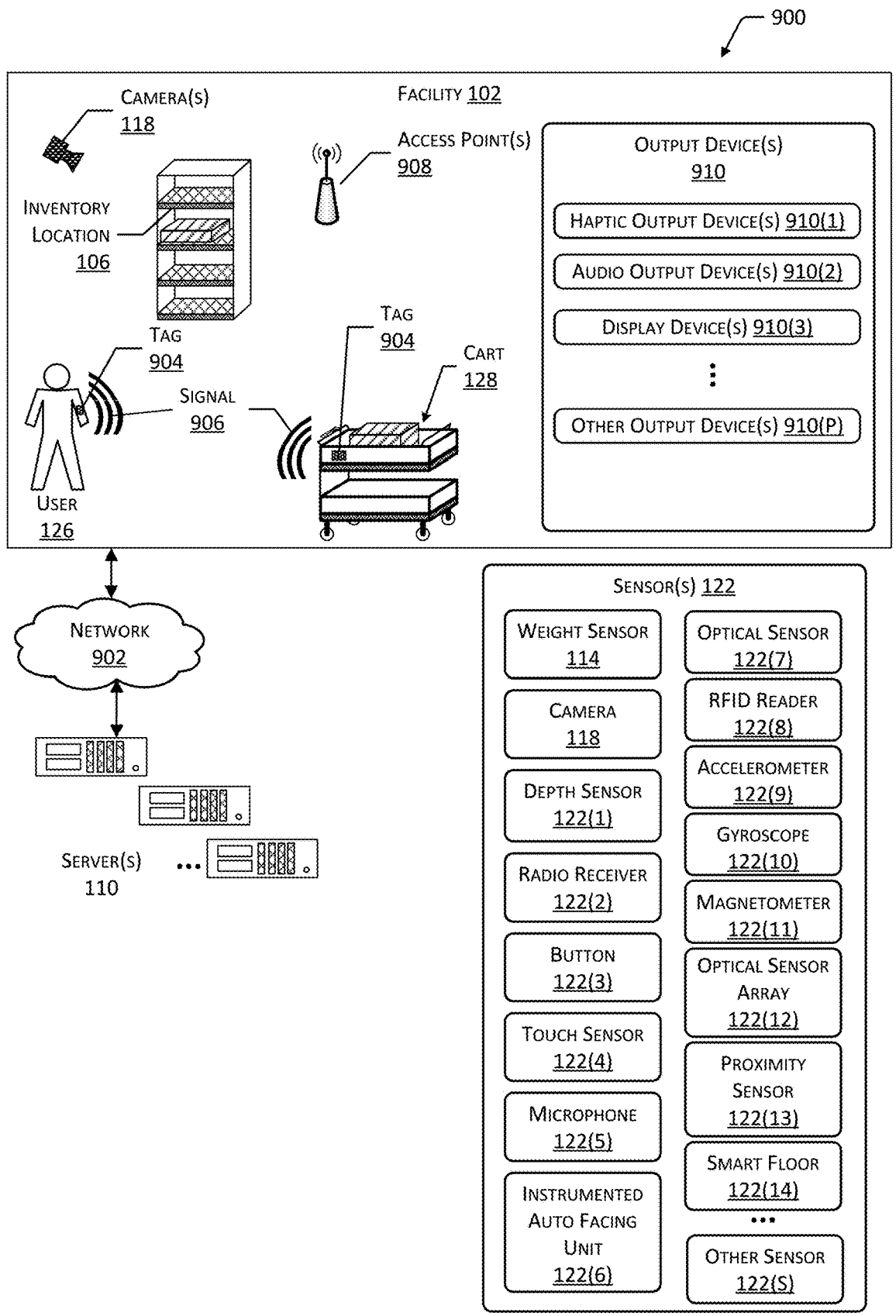
FIG. 9 is a block diagram illustrating additional details of the facility, according to some implementations.

FIG. 9 is a block diagram 900 illustrating additional details of the facility 102, according to some implementations. The facility 102 may be connected to one or more networks 902, which in turn connect to one or more servers 110. The network 902 may include private networks such as an institutional or personal intranet, public networks such as the Internet, or a combination thereof. The network 902 may utilize wired technologies (e.g., wires, fiber optic cables, and so forth), wireless technologies (e.g., radio frequency, infrared, acoustic, optical, and so forth), or other connection technologies. The network 902 is representative of any type of communication network, including one or more of data networks or voice networks. The network 902 may be implemented using wired infrastructure (e.g., copper cable, fiber optic cable, and so forth), a wireless infrastructure (e.g., cellular, microwave, satellite, and so forth), or other connection technologies.

The servers 110 may be configured to execute one or more modules or software applications associated with the inventory management system 112 or other systems. While the servers 110 are illustrated as being in a location outside of the facility 102, in other implementations, at least a portion of the servers 110 may be located at the facility 102. The servers 110 are discussed in more detail below with regard to FIG. 10.

The users 126, the carts 128, items 108, or other objects in the facility 102 may be equipped with one or more tags 904. The tags 904 may be configured to emit a signal 906. In one implementation, the tag 904 may be a radio frequency identification (RFID) tag 904 configured to emit a RF signal 906 upon activation by an external signal. For example, the external signal may comprise a radio frequency signal or a magnetic field configured to energize or activate the RFID tag 904. In another implementation, the tag 904 may comprise a transmitter and a power source configured to power the transmitter. For example, the tag 904 may comprise a Bluetooth Low Energy (BLE) transmitter and battery. In other implementations, the tag 904 may use other techniques to indicate presence of the tag 904. For example, an acoustic tag 904 may be configured to generate an ultrasonic signal 906, which is detected by corresponding acoustic receivers. In yet another implementation, the tag 904 may be configured to emit an optical signal 906.

The inventory management system 112 may be configured to use the tags 904 for one or more of identification of the object, determining a location of the object, and so forth. For example, the users 126 may wear tags 904, the carts 128 may have tags 904 affixed, items 108 may have tags 904 affixed to their packaging, and so forth, which may be read and, based at least in part on signal strength, used to determine one or more of identity or location.

Generally, the inventory management system 112 or other systems associated with the facility 102 may include any number and combination of input components, output components, and servers 110.

The one or more sensors 122 may be arranged at one or more locations within the facility 102. For example, the sensors 122 may be mounted on or within a floor, wall, at a ceiling, at an inventory location 106, on a cart 128, may be carried or worn by a user 126, and so forth.

The one or more weight sensors 114 are configured to measure the weight of a load, such as the item 108, the cart 128, or other objects. The weight sensors 114 may be configured to measure the weight of the load at one or more of the inventory locations 106, the cart 128, on the floor of the facility 102, and so forth. For example, the shelf may include a plurality of lanes or platforms, with one or more weight sensors 114 beneath each one to provide weight data 116 about an individual lane or platform. The weight sensors 114 may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 114 may operate as transducers that generate one or more signals based on an applied force, such as that of the load due to gravity. For example, the weight sensor 114 may comprise a load cell having a strain gauge and a structural member that deforms slightly when weight is applied. By measuring a change in the electrical characteristic of the strain gauge, such as capacitance or resistance, the weight may be determined. In another example, the weight sensor 114 may comprise a force sensing resistor (FSR). The FSR may comprise a resilient material that changes one or more electrical characteristics when compressed. For example, the electrical resistance of a particular portion of the FSR may decrease as the particular portion is compressed. The inventory management system 112 may use the data acquired by the weight sensors 114 to identify an object, determine a change in the quantity of objects, determine a location of an object, maintain shipping records, and so forth.

The sensors 122 may include one or more cameras 118 or other imaging sensors. The one or more cameras 118 may include imaging sensors configured to acquire images of a scene. The cameras 118 are configured to detect light in one or more wavelengths including, but not limited to, terahertz, infrared, visible, ultraviolet, and so forth. The cameras 118 may comprise charge coupled devices (CCD), complementary metal oxide semiconductor (CMOS) devices, microbolometers, and so forth. The inventory management system 112 may use image data 120 acquired by the cameras 118 during operation of the facility 102. For example, the inventory management system 112 may identify items 108, users 126, carts 128, and so forth, based at least in part on their appearance within the image data 120 acquired by the cameras 118. The cameras 118 may be mounted in various locations within the facility 102. For example, cameras 118 may be mounted overhead, on inventory locations 106, may be worn or carried by users 126, may be affixed to carts 128, and so forth. In some implementations, the cameras 118 may include or be combined with a depth sensor 122(1) as described below.

One or more depth sensors 122(1) may also be included in the sensors 122. The depth sensors 122(1) are configured to acquire spatial or three-dimensional (3D) data, such as depth information, about objects within a FOV. The depth sensors 122(1) may include range cameras, lidar systems, sonar systems, radar systems, structured light systems, stereo vision systems, optical interferometry systems, and so forth. The inventory management system 112 may use the 3D data acquired by the depth sensors 122(1) to identify objects, determine a location of an object in 3D real space, identify users 126, and so forth.

One or more radio receivers 122(2) may also be included as sensors 122. In some implementations, the radio receivers 122(2) may be part of transceiver assemblies. The radio receivers 122(2) may be configured to acquire RF signals 906 associated with RFID, Wi-Fi, Bluetooth, ZigBee, 2G, 3G, 4G, LTE, or other wireless data transmission technologies. The radio receivers 122(2) may provide information associated with data transmitted via radio frequencies, signal strength of RF signals 906, and so forth. For example, information from the radio receivers 122(2) may be used by the inventory management system 112 to determine a location of an RF source, such as a transmitter carried by the user 126, a transmitter on the cart 128, a tag 904 on the item 108, and so forth.

One or more buttons 122(3) may be configured to accept input from the user 126. The buttons 122(3) may comprise mechanical, capacitive, optical, or other mechanisms. For example, the buttons 122(3) may comprise mechanical switches configured to accept an applied force from a touch of the user 126 to generate an input signal. The inventory management system 112 may use data from the buttons 122(3) to receive information from the user 126. For example, the cart 128 may be configured with a button 122(3) to accept input from the user 126 and send information indicative of the input to the inventory management system 112.

The sensors 122 may include one or more touch sensors 122(4). The touch sensors 122(4) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The inventory management system 112 may use data from the touch sensors 122(4) to receive information from the user 126. For example, the touch sensor 122(4) may be integrated with the cart 128 to provide a touchscreen with which the user 126 may select from a menu one or more particular items 108 for picking, enter a manual count of items 108 at an inventory location 106, and so forth.

One or more microphones 122(5) may be configured to acquire information indicative of sound present in the environment. In some implementations, arrays of microphones 122(5) may be used. These arrays may implement beamforming techniques to provide for directionality of gain. The inventory management system 112 may use the one or more microphones 122(5) to acquire information from acoustic tags 904, accept voice input from the users 126, determine ambient noise level, and so forth.

The sensors 122 may include instrumented auto facing units (IAFUs) 122(6). The IAFU 122(6) may comprise a position sensor configured to provide data indicative of displacement of a pusher. As an item 108 is removed from the IAFU 122(6), the pusher moves, such as under the influence of a spring, and pushes the remaining items 108 in the IAFU 122(6) to the front of the inventory location 106. By using data from the position sensor, and given item data 140 such as a depth of an individual item 108, a count may be determined, based on a change in position data. For example, if each item 108 is 1 inch deep, and the position data indicates a change of 9 inches, the quantity held by the IAFU 122(6) may have changed by 9 items 108. This count information may be used to confirm or provide a cross check for a count obtained by other means, such as analysis of the weight data 116.

The sensors 122 may include one or more optical sensors 122(7). The optical sensors 122(7) may be configured to provide data indicative of one or more of color or intensity of light impinging thereupon. For example, the optical sensor 122(7) may comprise a photodiode and associated circuitry configured to generate a signal or data indicative of an incident flux of photons. As described below, the optical sensor array 122(12) may comprise a plurality of the optical sensors 122(7). The optical sensors 122(7) may include photodiodes, photoresistors, photovoltaic cells, quantum dot photoconductors, bolometers, pyroelectric infrared detectors, and so forth. For example, the optical sensor 122(7) may use germanium photodiodes to detect infrared light.

One or more radio frequency identification (RFID) readers 122(8), near field communication (NFC) systems, and so forth, may be included as sensors 122. For example, the RFID readers 122(8) may be configured to read the RF tags 904. Information acquired by the RFID reader 122(8) may be used by the inventory management system 112 to identify an object associated with the RF tag 904 such as the item 108, the user 126, the cart 128, and so forth. For example, based on information from the RFID readers 122(8) detecting the RF tag 904 at a particular inventory location, an item 108 being placed 124 or picked 126 may be determined.

The sensors 122 may include one or more accelerometers 122(9), which may be worn or carried by the user 126, mounted to the cart 128, and so forth. The accelerometers 122(9) may provide information such as the direction and magnitude of an imposed acceleration. Data such as rate of acceleration, determination of changes in direction, speed, and so forth, may be determined using the accelerometers 122(9).

A gyroscope 122(10) may provide information indicative of rotation of an object affixed thereto. For example, the cart 128 or other objects may be equipped with a gyroscope 122(10) to provide data indicative of a change in orientation of the object.

A magnetometer 122(11) may be used to determine an orientation by measuring ambient magnetic fields, such as the terrestrial magnetic field. The magnetometer 122(11) may be worn or carried by the user 126, mounted to the cart 128, and so forth. For example, the magnetometer 122(11) mounted to the cart 128 may act as a compass and provide information indicative of which direction the cart 128 is oriented.

An optical sensor array 122(12) may comprise one or optical sensors 122(7). The optical sensors 122(7) may be arranged in a regular, repeating, or periodic two-dimensional arrangement such as a grid. The optical sensor array 122(12) may generate image data. For example, the optical sensor array 122(12) may be arranged within or below an inventory location 106 and obtain information about shadows of items 108, hand of the user 126, and so forth.

The sensors 122 may include proximity sensors 122(13) used to determine presence of an object, such as the user 126, the cart 128, and so forth. The proximity sensors 122(13) may use optical, electrical, ultrasonic, electromagnetic, or other techniques to determine a presence of an object. In some implementations, the proximity sensors 122(13) may use an optical emitter and an optical detector to determine proximity. For example, an optical emitter may emit light, a portion of which may then be reflected by the object back to the optical detector to provide an indication that the object is proximate to the proximity sensor 122(13). In other implementations, the proximity sensors 122(13) may comprise a capacitive proximity sensor 122(13) configured to provide an electrical field and determine a change in electrical capacitance due to presence or absence of an object within the electrical field.

The proximity sensors 122(13) may be configured to provide sensor data indicative of one or more of a presence or absence of an object, a distance to the object, or characteristics of the object. An optical proximity sensor 122(13) may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using a sensor 122 such as a camera 118. Based on an apparent distance between the features of the structured light pattern, the distance to the object may be calculated. Other techniques may also be used to determine distance to the object. In another example, the color of the reflected light may be used to characterize the object, such as skin, clothing, cart 128, and so forth.

The sensors 122 may include a smart floor 122(14). The smart floor 122(14) that is able to provide information about the location of objects, such as users 126, carts 128, and so forth. This information may include identifying the object, determining a location of the object at different times, and so forth. The smart floor 122(14) may utilize smart floor devices that comprise one or more of transmitters or receivers that radiate or receive electromagnetic signals from antennas located at or underneath the floor. Based on information about what antenna radiated a signal and what antenna acquired the signal, information about an object on or above the smart floor 122 (14) may be determined. For example, the smart floor 122(14) may comprise sensing elements, or segments. Each segment may include an antenna that is coupled to one or more of a transmitter or a receiver. During operation, the segment may transmit an electromagnetic signal that is radiated by the antenna, receive an electromagnetic signal that is acquired by the antenna, or both. In some implementations the smart floor 122 (14) may operate as a physically large touch sensor that is deployed at floor level. The electromagnetic signals to provide information about the presence of an object thereon. For example, the segments may electromagnetically couple to objects that are close by, allowing for the detection of objects that are either in contact with the floor or above the floor. In some implementations, instead of or in addition to the visual tracking of the object, the smart floor 122(14) may be used to provide object representation movement data as described below. For example, the output from the segments obtained during a particular window of time may be processed in a fashion similar to the image data 120.

The sensors 122 may include other sensors 122(S) as well. For example, the other sensors 122(S) may include light curtains, ultrasonic rangefinders, thermometers, barometric sensors, hygrometers, and so forth.

In some implementations, the sensors 122 may include hardware processors, memory, and other elements configured to perform various functions. For example, the cameras 118 may be configured to generate image data 120, send the image data 120 to another device such as the server 110, and so forth.

The facility 102 may include one or more access points 908 configured to establish one or more wireless networks. The access points 908 may use Wi-Fi, NFC, Bluetooth, or other technologies to establish wireless communications between a device and the network 902. The wireless networks allow the devices to communicate with one or more of the sensors 122, the inventory management system 112, the tag 904, a communication device of the cart 128, or other devices.

Output devices 910 may also be provided in the facility 102. The output devices 910 are configured to generate signals, which may be perceived by the user 126 or detected by the sensors 122. In some implementations, the output devices 910 may be used to provide illumination of the optical sensor array 122(12).

Haptic output devices 910(1) are configured to provide a signal that results in a tactile sensation to the user 126. The haptic output devices 910(1) may use one or more mechanisms such as electrical stimulation or mechanical displacement to provide the signal. For example, the haptic output devices 910(1) may be configured to generate a modulated electrical signal, which produces an apparent tactile sensation in one or more fingers of the user 126. In another example, the haptic output devices 910(1) may comprise piezoelectric or rotary motor devices configured to provide a vibration, which may be felt by the user 126.

One or more audio output devices 910(2) may be configured to provide acoustic output. The acoustic output includes one or more of infrasonic sound, audible sound, or ultrasonic sound. The audio output devices 910(2) may use one or more mechanisms to generate the acoustic output. These mechanisms may include, but are not limited to, the following: voice coils, piezoelectric elements, magnetorestrictive elements, electrostatic elements, and so forth. For example, a piezoelectric buzzer or a speaker may be used to provide acoustic output.

The display devices 910(3) may be configured to provide output, which may be seen by the user 126 or detected by a light-sensitive sensor such as a camera 118 or an optical sensor 122(7). In some implementations, the display devices 910(3) may be configured to produce output in one or more of infrared, visible, or ultraviolet light. The output may be monochrome or in color. The display devices 910(3) may be one or more of emissive, reflective, microelectromechanical, and so forth. An emissive display device 910(3), such as using LEDs, is configured to emit light during operation. In comparison, a reflective display device 910(3), such as using an electrophoretic element, relies on ambient light to present an image. Backlights or front lights may be used to illuminate non-emissive display devices 910(3) to provide visibility of the output in conditions where the ambient light levels are low.

The display devices 910(3) may be located at various points within the facility 102. For example, the addressable displays may be located on inventory locations 106, carts 128, on the floor of the facility 102, and so forth.

Other output devices 910(P) may also be present. For example, the other output devices 910(P) may include scent/odor dispensers, document printers, 3D printers or fabrication equipment, and so forth.

Figure 10:
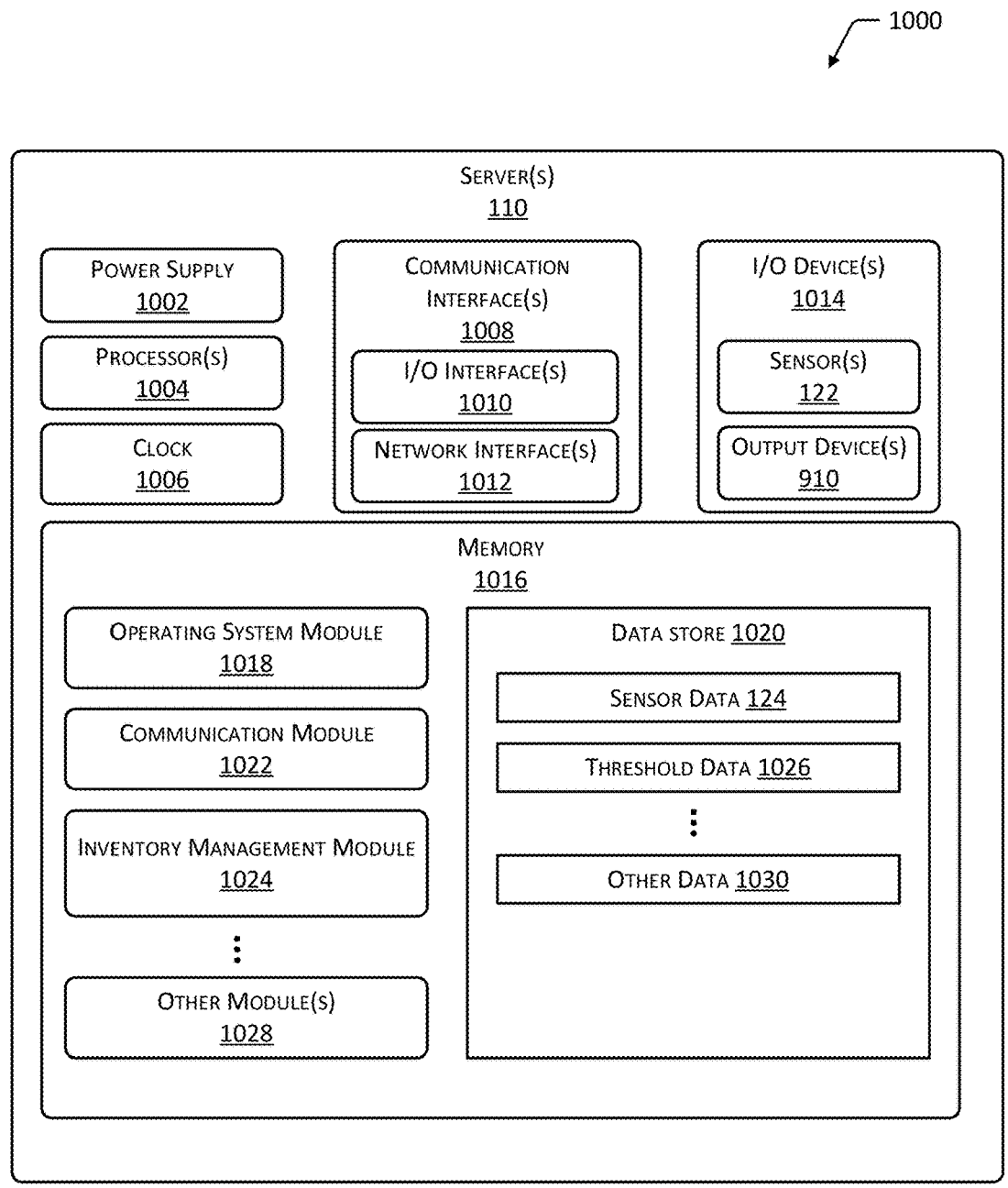
FIG. 10 is a block diagram of a server to support operation of the facility, according to some implementations.

FIG. 10 illustrates a block diagram 1000 of a server 110 configured to support operation of the facility 102, according to some implementations. The server 110 may be physically present at the facility 102, may be accessible by the network 902, or a combination of both. The server 110 does not require end-user knowledge of the physical location and configuration of the system that delivers the services. Common expressions associated with the server 110 may include "on-demand computing", "software as a service (SaaS)", "platform computing", "network-accessible platform", "cloud services", "data centers", and so forth. Services provided by the server 110 may be distributed across one or more physical or virtual devices.

One or more power supplies 1002 may be configured to provide electrical power suitable for operating the components in the server 110. The one or more power supplies 1002 may comprise batteries, capacitors, fuel cells, photovoltaic cells, wireless power receivers, conductive couplings suitable for attachment to an external power source such as provided by an electric utility, and so forth. The server 110 may include one or more hardware processors 1004 (processors) configured to execute one or more stored instructions. The processors 1004 may comprise one or more cores. One or more clocks 1006 may provide information indicative of date, time, ticks, and so forth. For example, the processor 1004 may use data from the clock 1006 to associate a particular interaction with a particular point in time.

The server 110 may include one or more communication interfaces 1008 such as input/output (I/O) interfaces 1010, network interfaces 1012, and so forth. The communication interfaces 1008 enable the server 110, or components thereof, to communicate with other devices or components. The communication interfaces 1008 may include one or more I/O interfaces 1010. The I/O interfaces 1010 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 1010 may couple to one or more I/O devices 1014. The I/O devices 1014 may include input devices such as one or more of a sensor 122, keyboard, mouse, scanner, and so forth. The I/O devices 1014 may also include output devices 910 such as one or more of a display device 910(3), printer, audio speakers, and so forth. In some embodiments, the I/O devices 1014 may be physically incorporated with the server 110 or may be externally placed.

The network interfaces 1012 may be configured to provide communications between the server 110 and other devices, such as the carts 128, routers, access points 908, and so forth. The network interfaces 1012 may include devices configured to couple to personal area networks (PANS), local area networks (LANs), wireless local area networks (WLANS), wide area networks (WANs), and so forth. For example, the network interfaces 1012 may include devices compatible with Ethernet, Wi-Fi, Bluetooth, ZigBee, and so forth.

The server 110 may also include one or more busses or other internal communications hardware or software that allow for the transfer of data between the various modules and components of the server 110.

As shown in FIG. 10, the server 110 includes one or more memories 1016. The memory 1016 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 1016 provides storage of computer-readable instructions, data structures, program modules, and other data for the operation of the server 110. A few example functional modules are shown stored in the memory 1016, although the same functionality may alternatively be implemented in hardware, firmware, or as a system on a chip (SoC).

The memory 1016 may include at least one operating system (OS) module 1018. The OS module 1018 is configured to manage hardware resource devices such as the I/O interfaces 1010, the I/O devices 1014, the communication interfaces 1008, and provide various services to applications or modules executing on the processors 1004. The OS module 1018 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 1016 may be a data store 1020 and one or more of the following modules. These modules may be executed as foreground applications, background tasks, daemons, and so forth. The data store 1020 may use a flat file, database, linked list, tree, executable code, script, or other data structure to store information. In some implementations, the data store 1020 or a portion of the data store 1020 may be distributed across one or more other devices including the servers 110, network attached storage devices, and so forth.

A communication module 1022 may be configured to establish communications with one or more of the carts 128, sensors 122, display devices 910(3), other servers 110, or other devices. The communications may be authenticated, encrypted, and so forth.

The memory 1016 may store an inventory management module 1024. The inventory management module 1024 is configured to provide the functions as described herein with regard to the inventory management system 112. For example, the inventory management module 1024 may generate the interaction data 148, determine user billing data 154, generate restock data 158, and so forth.

Information used by the inventory management module 1024 may be stored in the data store 1020. For example, the data store 1020 may store the item data 140, the physical layout data 142, threshold data 1026, interaction data 148, user billing data 154, and so forth.

The inventory management module 1024 may utilize this information during operation. For example, the user location module 202 may utilize physical layout data 142 to determine what image data 120 acquired from particular cameras 118 corresponds to a particular shelf, lane, or other inventory location.

The inventory management module 1024 may use one or more thresholds, ranges, and so forth specified by threshold data 1026. For example, the threshold value may specify a minimum quantity value below which a restocking order is generated.

Other modules 1028 may also be present in the memory 1016 as well as other data 1030 in the data store 1020. For example, the other modules 1028 may include a restocking module.

Figure 11:
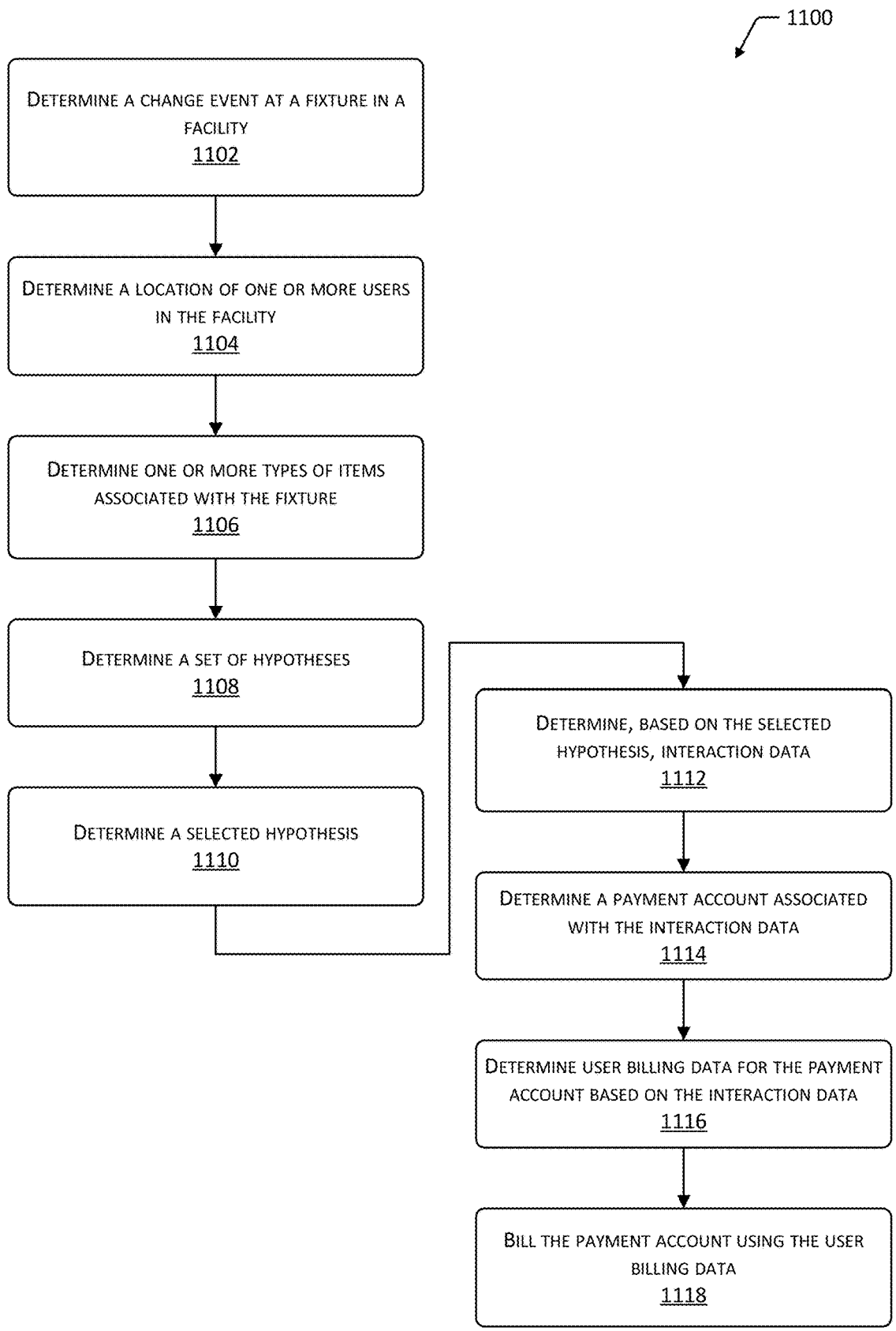
FIG. 11 is a flow diagram of a process to determine interaction data and bill a payment account, according to some implementations.

FIG. 11 is a flow diagram 1100 of a process to determine interaction data 148 and bill a payment account, according to some implementations. The process may be implemented as least in part by the inventory management system 112.

At 1102, a weight change event indicative of a weight change at a fixture 104 at the facility 102 is determined. For example, the weight sensors 114 may produce weight data 116 indicative of a change in weight from a first time to a second time. The weight processing module 130 may process the weight data 116 and determine that the change in weight exceeds a threshold and is representative of a weight change event. The fixture 104 may include one or more inventory locations 106, which may be divided into one or more areas associated with stowage of one or more types of items 108.

At 1104, a location of one or more users 126 in the facility is determined. For example, the user location module 202 may use the image data 120 to determine the location data 204 that is indicative of where each user 126 is. The location data 204 may indicate that at least one of the one or more users 126 are within a threshold distance of the fixture 104.

In some implementations other data may also be determined. For example, touchpoint data 208, area status data 212, trajectory data 216, segmentation data 220, item in-hand data 224, and so forth.

At 1106, one or more types of items 108 that are associated with the fixture 104 are determined. In one implementation, the physical layout data 142 may be accessed and used to retrieve the types of items 108 that are designated as being stowed at fixture 104, or a portion thereof. For example, if the weight change event is associated with a particular shelf 406, then the types of items 108 designated as being stowed at that shelf 406 may be retrieved. In another example, the types of items 108 associated with particular areas indicated by the touchpoint data 208, area status data 212, trajectory data 216, and so forth may be determined.

At 1108, a set of hypotheses are determined. For example, the hypothesis module 302 may use the weight output data 132 such as the weight change of the weight change event, the physical layout data 142, the image output data 136, and so forth to determine the hypotheses data 304 indicating possible actions by possible users 126 at possible inventory locations 106. In some implementations, each hypothesis that is generated may have a confidence value that is indicative of a likelihood that the hypothesis is indicative of the actual interaction.

At 1110, a selected hypothesis is determined. In one implementation, the hypotheses assessment module 306 may generate selected hypothesis data 308. For example, the hypotheses assessment module 306 may determine the hypothesis with the greatest confidence value and designate this as the selected hypothesis.

At 1112, based on the selected hypothesis, the interaction data 148 is determined. For example, the interaction module 138 may use the selected hypothesis in the selected hypothesis data 308 to generate the interaction data 148.

At 1114, a payment account associated with the interaction data 148 is determined. For example, the interaction data 148 may indicate that a quantity of 1 of an item 108 was picked by user 126(1). The billing module 150 may use the account data 152 to determine the payment account associated with user 126(1).

At 1116, user billing data 154 for the payment account is determined based on the interaction data 148. For example, the billing module 150 may generate a record to bill the payment account of the user 126(1) for the cost of 1 of the item 108 that was picked.

At 1118, the payment account is billed using the user billing data 154. For example, the record may be processed, resulting in a debit of the payment account of the user 126(1).

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
    a shelf having:
        a first area and a second area, wherein the first area and the second area store one or more types of items; and
        a plurality of weight sensors to measure weight of items stowed at the first area and the second area and generate weight data;
    one or more cameras to generate image data, the one or more cameras having a field of view that includes at least a portion of the shelf; and
    one or more processors to execute instructions to:
        determine, based on the weight data, a weight change event that is indicative of a first weight change that occurs at the shelf from a first time to a second time;
        determine a portion of the image data changed from the first time to the second time;
        associate the portion of the image data that changed from the first time to the second time with a front edge of the shelf;
        determine, based on the image data, touchpoint data indicative of a touch position with respect to the front edge of the shelf where a hand has gone past the front edge of the shelf, the touch position indicative of a distance from left to right along the front edge of the shelf where the hand has gone past the front edge of the shelf;
        determine the touch position corresponds to the first area;
        determine physical layout data indicative of a first type of item associated with the first area;
        determine, based on the first weight change, the touch position, and the physical layout data, a first set of hypotheses, wherein each hypothesis in the first set of hypotheses has a confidence value;
        select a hypothesis from the first set of hypotheses that has a greatest confidence value; and
        determine, based on the hypothesis that is selected, interaction data indicative of a type of item, a quantity of the type of item, and a type of interaction, wherein the type of interaction is a pick of the type of item from the shelf or a place of the type of item to the shelf.

2. The system of claim 1, the one or more processors to further execute the instructions to:
    determine, based on the image data, a location of a user;
    determine the location of the user is within a threshold distance of the shelf; and
    the determination of the first set of hypotheses is further based on the location of the user.

3. A method comprising:
    determining, based on sensor data from one or more sensors at a fixture, that an event occurred at the fixture from a first time to a second time;
    determining, based at least in part on image data obtained from a camera having a field of view that includes at least a portion of the fixture, trajectory data associated with a first user, the trajectory data indicative of a direction of movement of at least a portion of the first user between the first time and the second time;
    determining a first area of a plurality of areas of the fixture based on the trajectory data;
    determining one or more types of items associated with the first area of the fixture;
    determining, based at least in part on the sensor data, the trajectory data, and the first area of the fixture, a first set of hypotheses, wherein each hypothesis in the first set of hypotheses comprises an identification of a type of item and a quantity of the type of item associated with the event, and wherein the each hypothesis in the first set of hypotheses has a confidence value;
    determining, based on the confidence value, a hypothesis from the first set of hypotheses; and
    determining, based on the hypothesis, interaction data.

4. The method of claim 3, wherein the interaction data is indicative of a particular type of item, a quantity of the particular type of item, and a type of interaction comprising one or more of removal of the particular type of item from the fixture, placement of the particular type of item to the fixture, or rummaging involving the particular type of item at the fixture.

5. The method of claim 3, further comprising:
    determining, based on the image data, an interaction by the first user with the first area of the fixture, wherein the interaction begins at the first time and ends at the second time;
    wherein the determining the one or more types of items associated with the first area of the fixture comprises retrieving information about the types of items designated as being stowed at the first area of the fixture; and
    wherein the sensor data comprises weight data obtained between the first time and the second time.

6. The method of claim 3, wherein the sensor data is indicative of a weight change from the first time to the second time, and the method further comprising:
- determining a first image of the first area of the fixture at or near the first time;
- determining a second image of the first area of the fixture at or near the second time;
- determining, based on the first image and the second image, a status of the first area of the fixture that is indicative of one of: no change at the first area of the fixture, or a change at the first area of the fixture; and
- wherein the determining the hypothesis from the first set of hypotheses is further based on the status of the first area of the fixture.

7. The method of claim 3, wherein the sensor data is indicative of weight change obtained between the first time and the second time, and the method further comprising:
- determining a first location of the first user is within a threshold distance of the fixture at a time proximate to the event;
- wherein the trajectory data is indicative of movement of one or more of a hand or an arm of the first user towards or away from the fixture;
- wherein the confidence value is based at least in part on the trajectory data; and
- wherein the hypothesis is indicative of the first user.

8. The method of claim 3, further comprising:
- determining an identifier associated with the first user;
- retrieving, based on the identifier, cart data indicative of one or more types of items that are deemed to be in custody of the first user before the event; and
- wherein the determining the first set of hypotheses is based at least in part on the one or more types of items associated with the first area of the fixture and the cart data.

9. The method of claim 3, wherein the fixture comprises the first area and a second area, and the method further comprising:
- determining, based at least in part on the sensor data, an estimated location of an interaction that includes the first area and the second area;
- determining the first area and the second area are associated with a first type of item; and
- increasing the confidence values of those hypotheses in the first set of hypotheses that involve the first type of item.

10. The method of claim 3, further comprising:
- determining, based at least in part on the image data, a first location of the first user;
- determining, based at least in part on the image data, a second location of a second user;
- determining the first user and the second user are within a threshold distance of the fixture at a time proximate to the event;
- determining no other users are within the threshold distance of the fixture at the time proximate to the event;
- determining the first user and the second user are associated with a first payment account; and
- increasing the confidence values of those hypotheses in the first set of hypotheses that involve the first user or the second user.

11. A method comprising:
- determining event data associated with a fixture based on sensor data acquired from one or more sensors at the fixture;
- acquiring image data from a camera having a field of view that includes at least a portion of the fixture;
- determining, based on the image data, touchpoint data indicative of a touch position of at least a portion of a first user with respect to a front edge of the fixture;
- determining the touch position is associated with a first area of the fixture;
- determining one or more types of items associated with the first area of the fixture;
- determining a first set of hypotheses based at least in part on the event data, the touchpoint data, and at least the one or more types of items associated with the first area of the fixture, wherein each hypothesis in the first set of hypotheses comprises an identification of a type of item associated with the event data and a quantity of the type of item;
- determining a hypothesis from the first set of hypotheses; and
- determining, based on the hypothesis, interaction data.

12. The method of claim 11, further comprising:
- determining the first user is associated with the event data;
- determining an account associated with the first user; and
- wherein the interaction data is indicative of the account.

13. The method of claim 11, the determining the event data associated with the fixture further comprising:
- determining a first weight supported by the fixture at a first time;
- determining a second weight supported by the fixture at a second time; and
- determining a weight change based on the first weight and the second weight.

14. The method of claim 11, the determining the event data associated with the fixture further comprising:
- determining a first image of the first area of the fixture at a first time;
- determining a second image of the first area of the fixture at a second time;
- determining, based on the first image and the second image, a status of the first area of the fixture that is indicative of a change at the first area; and
- wherein hypotheses in the first set of hypotheses are limited to the one or more types of items associated with the first area.

15. The method of claim 11, the determining the event data associated with the fixture further comprising:
- determining first hand data indicative of movement of a hand of the first user into the first area of the fixture at a first time;
- determining second hand data indicative of movement of the hand of the first user out of the first area of the fixture at a second time; and
- wherein hypotheses in the first set of hypotheses are limited to the one or more types of items associated with the first area.

16. The method of claim 11, further comprising:
- determining the first area of the fixture is associated with the event data;
- determining, based on first image data, that a hand of the first user is empty at a first time;
- determining, based on second image data, that the hand of the first user is holding an item at a second time;
- determining a candidate item set based on the one or more types of items associated with the first area of the fixture; and
- wherein the determining the first set of hypotheses is based at least in part on the candidate item set and is constrained to hypotheses involving removal of the one or more types of items from the first area of the fixture.

17. The method of claim 11, further comprising:
determining the first user is associated with the event data;
determining a second user is associated with the event data;
accessing cart data indicative of one or more types of items that are deemed to be in custody of the first user before an event indicated by the event data;
wherein the hypothesis is indicative of a return of a first type of item;
determining that the cart data does not include the first type of item;
associating the hypothesis with the second user; and
wherein the interaction data is indicative of the return of the first type of item by the second user to the fixture.

18. The method of claim 11, further comprising:
determining a first weight supported by the fixture at a first time;
determining a second weight supported by the fixture at a second time;
determining a weight change based on the first weight and the second weight;
determining a first image of the first area of the fixture at or before the first time;
determining a second image of the first area of the fixture at or after the second time;
determining, based on the first image and the second image, status data of the first area of the fixture that is indicative of one of: no change at the first area of the fixture, or a change at the first area of the fixture; and
wherein the determining the hypothesis is further based on the status data.

19. The method of claim 11, the determining the event data associated with the fixture further comprising:
determining a first weight supported by the fixture at a first time;
determining a second weight supported by the fixture at a second time;
determining a weight change based on the first weight and the second weight; and
determining, based on the image data, that a hand is proximate to the first area of the fixture at one or more of the first time or the second time.

20. The method of claim 11, further comprising:
determining, based at least in part on the event data, an estimated location of an interaction that includes at least a portion of the first area and a second area of the fixture;
determining the first area and the second area are associated with a first type of item; and
increasing confidence values of those hypotheses in the first set of hypotheses that involve the first type of item.

\* \* \* \* \*